US 8,801,086 B2

(12) United States Patent
Obe et al.

(10) Patent No.: US 8,801,086 B2
(45) Date of Patent: Aug. 12, 2014

(54) CABIN SYSTEM

(71) Applicant: Kubota Corporation, Osaka (JP)

(72) Inventors: Mitsuhiko Obe, Sakai (JP); Azusa Hirano, Sakai (JP); Eiichi Ishida, Sakai (JP); Kenichi Ishido, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/917,161

(22) Filed: Jun. 13, 2013

(65) Prior Publication Data

US 2013/0270867 A1 Oct. 17, 2013

Related U.S. Application Data

(62) Division of application No. 13/052,802, filed on Mar. 21, 2011, now Pat. No. 8,485,589.

(30) Foreign Application Priority Data

| Mar. 30, 2010 | (JP) | 2010-078828 |
| Mar. 30, 2010 | (JP) | 2010-078829 |
| Mar. 30, 2010 | (JP) | 2010-078830 |
| Apr. 20, 2010 | (JP) | 2010-096934 |

(51) Int. Cl.
*B60J 7/00* (2006.01)

(52) U.S. Cl.
USPC .................................. 296/190.09

(58) Field of Classification Search
USPC ........ 296/190.09, 190.08, 208; 454/137, 141, 454/155, 158, 69; 62/239, 244
See application file for complete search history.

(56) References Cited

U.S. PATENT DOCUMENTS

| 3,868,896 | A | * | 3/1975 | Doll et al. ..................... 454/137 |
| 4,772,065 | A | | 9/1988 | Nakata et al. |
| 5,119,718 | A | | 6/1992 | Wagner et al. |
| 5,399,121 | A | | 3/1995 | Gray et al. |
| 5,911,624 | A | * | 6/1999 | Stauffer ......................... 454/158 |
| 6,938,677 | B2 | * | 9/2005 | Yamakawa et al. ............. 165/42 |
| 7,021,074 | B2 | | 4/2006 | Hara et al. |
| 7,247,088 | B2 | * | 7/2007 | Sogame ......................... 454/124 |
| 7,252,585 | B2 | * | 8/2007 | Ichikawa et al. ............. 454/137 |
| 7,290,829 | B2 | * | 11/2007 | Umemoto et al. ........ 296/190.08 |

(Continued)

FOREIGN PATENT DOCUMENTS

| EP | 0863066 A1 | 9/1998 |
| EP | 1609701 A1 | 12/2005 |

(Continued)

*Primary Examiner* — Kiran B Patel
(74) *Attorney, Agent, or Firm* — The Webb Law Firm

(57) ABSTRACT

A cabin system to be mounted on a vehicle body includes a driver's seat, an air conditioner body for indoor air conditioning disposed downwardly of the driver's seat, a plurality of support pillars constituting a cabin framework, a ceiling portion, and a main duct having a hollow tubular construction, the main duct forming therein an air passageway for the indoor air conditioning. The main duct includes, at a lower portion thereof, a duct connecting opening to be connected to the air conditioner body and also includes, at a lateral portion thereof, a support pillar engaging face. The main duct is attached through the support pillar engaging face to one of the support pillars along an indoor side peripheral face of the one support pillar. The support pillar engaging face of the main duct and the indoor side peripheral face of the one support pillar have profiles complementary with each other.

4 Claims, 39 Drawing Sheets

(56) References Cited

U.S. PATENT DOCUMENTS

| | | | |
|---|---|---|---|
| 7,338,357 B2* | 3/2008 | Voit et al. | 454/158 |
| 7,399,221 B2* | 7/2008 | Masumoto et al. | 454/155 |
| 7,559,601 B2 | 7/2009 | Ishii et al. | |
| 7,913,505 B2* | 3/2011 | Nakamura | 62/239 |
| 8,033,899 B2* | 10/2011 | Ichikawa et al. | 454/69 |
| 8,128,161 B2* | 3/2012 | Yang et al. | 296/208 |
| 8,366,524 B2* | 2/2013 | Ichikawa et al. | 454/69 |
| 8,376,817 B2* | 2/2013 | Ichikawa | 454/69 |
| 2005/0067140 A1 | 3/2005 | Sogame | |
| 2006/0170251 A1 | 8/2006 | Ishii et al. | |
| 2006/0186224 A1 | 8/2006 | Yoshii et al. | |
| 2007/0063549 A1 | 3/2007 | Sap et al. | |
| 2008/0163634 A1* | 7/2008 | Yoshii | 62/244 |
| 2010/0102594 A1 | 4/2010 | Kimura et al. | |
| 2011/0201263 A1* | 8/2011 | Srinivasan et al. | 454/141 |
| 2011/0226461 A1* | 9/2011 | Fujii et al. | 165/200 |

FOREIGN PATENT DOCUMENTS

| | | |
|---|---|---|
| EP | 2172353 A1 | 4/2010 |
| JP | 61177238 U | 11/1986 |
| JP | 1191639 A | 4/1999 |
| JP | 11254948 A | 9/1999 |
| JP | 200289601 A | 3/2002 |
| JP | 2002347668 A | 12/2002 |
| JP | 200356643 A | 2/2003 |
| JP | 2006199214 A | 3/2006 |
| JP | 20068075 A | 12/2006 |
| JP | 20068076 A | 12/2006 |
| JP | 200722459 A | 1/2007 |
| JP | 200763839 A | 3/2007 |
| JP | 200769776 A | 3/2007 |
| WO | 2004078562 A1 | 9/2004 |
| WO | 2009022510 A1 | 2/2009 |

* cited by examiner

CABIN SYSTEM

CROSS REFERENCE TO RELATED APPLICATIONS

This application is a divisional of and claims priority to co-pending U.S. patent application Ser. No. 13/052,802, filed Mar. 21, 2011, which claims priority to, under 35 U.S.C. §119 (a)-(d), Japan Patent Application No. 2010-078828, filed on Mar. 30, 2010, Japan Patent Application No. 2010-078829, filed on Mar. 30, 2010, Japan Patent Application No. 2010-078830, filed on Mar. 30, 2010, and Japan Patent Application No. 2010-096934, filed on Apr. 20, 2010, the entire disclosures of which are incorporated herein by reference.

FIELD OF THE INVENTION

The present inventions relates to a cabin system to be mounted on a vehicle such as a tractor.

DESCRIPTION OF THE RELATED ART

A cabin to be mounted on a vehicle body such as that of a tractor includes an air conditioner for making the cabin indoor environment comfortable. The body of the air conditioner having such air conditioner components as an evaporator, a blower, etc. can be disposed under a driver's seat inside the cabin. In this, in order to allow introduction of ambient air into the air conditioner body through an ambient air introducing opening provided in a ceiling portion of the cabin, an arrangement is known from the JP 2006-008075 A (or U.S. Pat. No. 7,290,829 B2 corresponding thereto), in which by utilizing the hollow structure of a support pillar of the cabin, this support pillar is utilized also as an ambient air introducing duct. For permitting such utilization of the cabin support pillar as an ambient air introducing duct as known from JP 2006-008075 A, a duct connecting opening to be connected to the air conditioner body needs to be open laterally in the vicinity of the lower end of this support pillar. However, this can not only lead to disadvantage of reduced strength of the support pillar, but can impose limitation on the cross sectional area of the support pillar, which limitation makes it impossible to secure an aperture area greater than the cross sectional area of the support pillar required as a duct aperture area (air passageway cross sectional area). Moreover, in the case of a type of support pillar comprised of a joined construction of an inner member and an outer member, there arises a further need of performing a caulking treatment along the entire length of the joint portion therefor in order to ensure sufficient air-tightness. For these reasons, there is a need for a cabin system which readily allows securing of required strength of the support pillar while allowing securing of required duct aperture area and which also can eliminate the need for the caulking treatment.

The arrangement of disposing an air conditioner body under a driver's seat is known from the JP 2006-199214 A. According to a cabin disclosed in JP 2006-199214 A, forwardly of the driver's seat, there is provided an air distributing duct that extends vertically, and a discharging opening for the conditioned air from the air conditioner body is connected via a relay duct to a lower end connection opening of the air distributing duct. With this, an amount of conditioned air discharged from the air conditioner body is sent via the relay duct, the air distributing duct to an indoor air discharging opening provided forwardly of the driver's seat, so that the conditioned air is supplied from this indoor air discharging opening to the inside of the cabin. The relay duct is configured to extend from the air conditioner body to the air distributing duct through the space upwardly of the front floor and at the right/left center of this front floor. With such conventional cabin system described above, the relay duct is disposed upwardly and at the right/left center of the front floor and this front floor does not form any inspection access opening for allowing inspection of the tractor body under the cabin. For this reason, for performing inspection of the vehicle body, this requires lifting up of the cabin to allow the inspection operation. Thus, the inspection operation is difficult and costly to perform.

Further, for assuring driver's comfort in such operations as a lifting up/down of a boom of a front loader mounted to the front side of the tractor body, a scooping/dumping operation of a bucket attached to the leading end of the boom, it is necessary to ensure unobstructed visibility of these components and operations from the driver's seat inside the cabin. In order to prevent the beam located forwardly and upwardly of the cabin from obstructing a driver's forward upward field of view, known from e.g. the JP 2007-022459 A or JP 2006-008076 A (or U.S. Pat. No. 7,290,829 B2 corresponding thereto) is a cabin system wherein a pair of right/left front support pillars are extended upward to raise the position of the front upper beam or wherein the front upper beam is formed high in the form of arch to enlarge the forward upward field of view. However, with these conventional cabin systems, due to the necessity of extending the front support pillars of the cabin upward, there arises the problem of increase of height of the cabin as a whole, thus the problem of enlargement. On the other hand, in the case of the construction of the front upper beam raised in the form of arch, there is no necessity of upward extension of the front support pillars; but, in order to raise the front upper beam in the form of arch which beam has its right/left opposed ends to be connected to the upper ends of the front support pillars placed under a rearwardly inclined state, such additional work for bending the front upper beam three-dimensionally or cutting its connecting face for connection with the upper ends of the rearwardly inclined front support pillars with alignment of the right/left opposed ends thereto. And, such additional work is costly. For these reasons, there is a need for a cabin system which avoids disadvantageous increase of the total height and size of the cabin and restricts the manufacture costs and which at the same time allows to secure good driver's view field forwardly and upwardly of the cabin.

SUMMARY OF THE INVENTION

The object of the present invention is to propose a cabin system with improvement for solving the above-described drawbacks of the convention.

The above-noted object is fulfilled according to one aspect of the present invention as under:

A cabin system to be mounted on a vehicle body, said cabin system comprising:

a driver's seat;

an air conditioner body for indoor air conditioning disposed downwardly of the drive's seat;

a plurality of support pillars constituting a cabin framework;

a ceiling portion; and a main duct having a hollow tubular construction, the main duct forming therein an air passageway for the indoor air conditioning;

wherein the main duct includes, at a lower portion thereof, a duct connecting opening to be connected to the air conditioner body and also includes, at a lateral portion thereof, a support pillar engaging face;

the main duct is attached through the support pillar engaging face to one of the support pillars along an indoor side peripheral face (a lateral face) of the one support pillar; and said support pillar, engaging face of the main duct and said indoor side peripheral face of the one support pillar have profiles complementary with each other.

With this construction, there is no need for such work as forming a lateral bore at the lower end of the support pillar, so that the sufficient strength of the support pillar can be secured. Further, the opening area of the duct used as an air passageway is free from restriction by the cross sectional area of the support pillar, so that sufficient duct opening area can be readily secured. Moreover, in case the support pillar has the two-split construction formed by welding an inner member and an outer member together, there is no need for any special work for ensuring air-tightness at this welded portion.

Preferably, the engaging (joining) faces of the main duct and the support pillar have mutually fitting profile shapes. With this, the positioning of the main duct relative to the support pillar is improved and the attached condition can be stable.

Further preferably, an ambient air introducing opening is formed in said ceiling portion so as to introduce ambient air at the highest position of the vehicle body and the main duct forms a connecting opening to be connected to the ambient air introducing opening at an upper portion of the main duct. Also preferably, the main duct includes, at an upper portion thereof, an air discharging opening for discharging an amount of conditioned air from the air conditioner body to the inside of the cabin. This arrangement is advantageous in that the main duct can be utilized as an air discharging opening for the conditioned air from the air conditioner body.

The above-noted object is fulfilled according to another aspect of the present invention also, as under:

A cabin system to be mounted on a vehicle body, said cabin system comprising:

a driver's seat;

an air conditioner body for indoor air conditioning disposed downwardly of the driver's seat;

a plurality of support pillars constituting a cabin framework;

a ceiling portion;

an air distributing duct vertically extending forwardly of the driver's seat;

a relay duct for connecting the air distributing duct to a conditioned air discharging opening of the air conditioner body;

an inspection access opening defined at a right/left center of a front floor constituting a floor face forwardly of the driver's seat;

an inspection access opening closing plate for closing the inspection access opening, the inspection access opening closing plate being attachable/detachable from inside the cabin;

wherein the relay duct is disposed downwardly of the inspection access opening closing plate and the relay duct can be detached toward the inside of the cabin through the inspection access opening.

With the above cabin system, by detaching the inspection access opening closing plate to expose the inspection access opening and subsequently removing the relay duct through the inspection access opening, inspection under the cabin or inspection of the structure under the cabin is made possible.

Further, as the removals of these components, i.e. the inspection access opening closing plate and the relay duct are possible from inside the cabin, the inspection under the cabin can be readily performed.

According to one preferred embodiment of the present invention, a front upper beam joining the upper portions of a pair of right/left front support pillars constituting the cabin framework is disposed to extend substantially parallel with the line of sight of a driver seated at the driver's seat in the cabin. According to a further preferred embodiment, said front upper beam is curved in the form of a forwardly convex arch along a plane parallel with the bottom face. It is also preferred to incline upper front faces of the front support pillars rearward by a predetermined angle relative to the vertical plane. With this arrangement, the upper front faces and the line of sight of the driver seated at the driver's seat inside the cabin framework intersect substantially perpendicular with each other.

With the above-described arrangements, the shape of the front upper beam as the cabin framework is viewed from its front face, can be an arch shape, so that the forward upper field of vision for the driver can be increased. In doing this, there is no need to upwardly extend the pair of right/left front support pillars, disadvantageous increase of the total height and the size of the cabin framework can be avoided. Further, since the above arrangement is possible by a simple work of forming the front upper beam into the forwardly convex arch (i.e. a two-dimensional work), the work cost can be restricted low. Further, if the front upper beam is comprised of an angular pipe having a quadrilateral cross section and a bottom face of the front upper beam is set substantially parallel with the line of sight of the driver seated a the driver's seat inside the cabin framework, the front upper beam is disposed along the direction parallel with the line of sight of the driver when this driver views the forward upward side. Hence, it becomes possible to minimize the area of obstruction by the front upper beam of the driver's field of view.

Moreover, as the front upper beam is comprised of an angular pipe having a quadrilateral cross section, the work for forming the front upper beam into the forwardly convex arch shape can be readily performed and the required strength can be readily obtained.

According to a further mode of the invention, a front frame of a skylight window frame is attached to the upper face of the front upper beam; and the upper face of the front upper beam and the front frame of the skylight window frame together form a rain gutter for draining rainwater to the right/left opposed sides of the front frame. With this construction, it is possible to avoid separately providing an upwardly projecting dam portion at the front end of the roof for preventing rainwater fallen onto the roof from flowing down along the front wind shield of the cabin to obstruct the driver's field of view.

DESCRIPTION OF THE PREFERRED EMBODIMENT(S)

Next, embodiments of a cabin system according to the present invention will be described.

Figure 1:
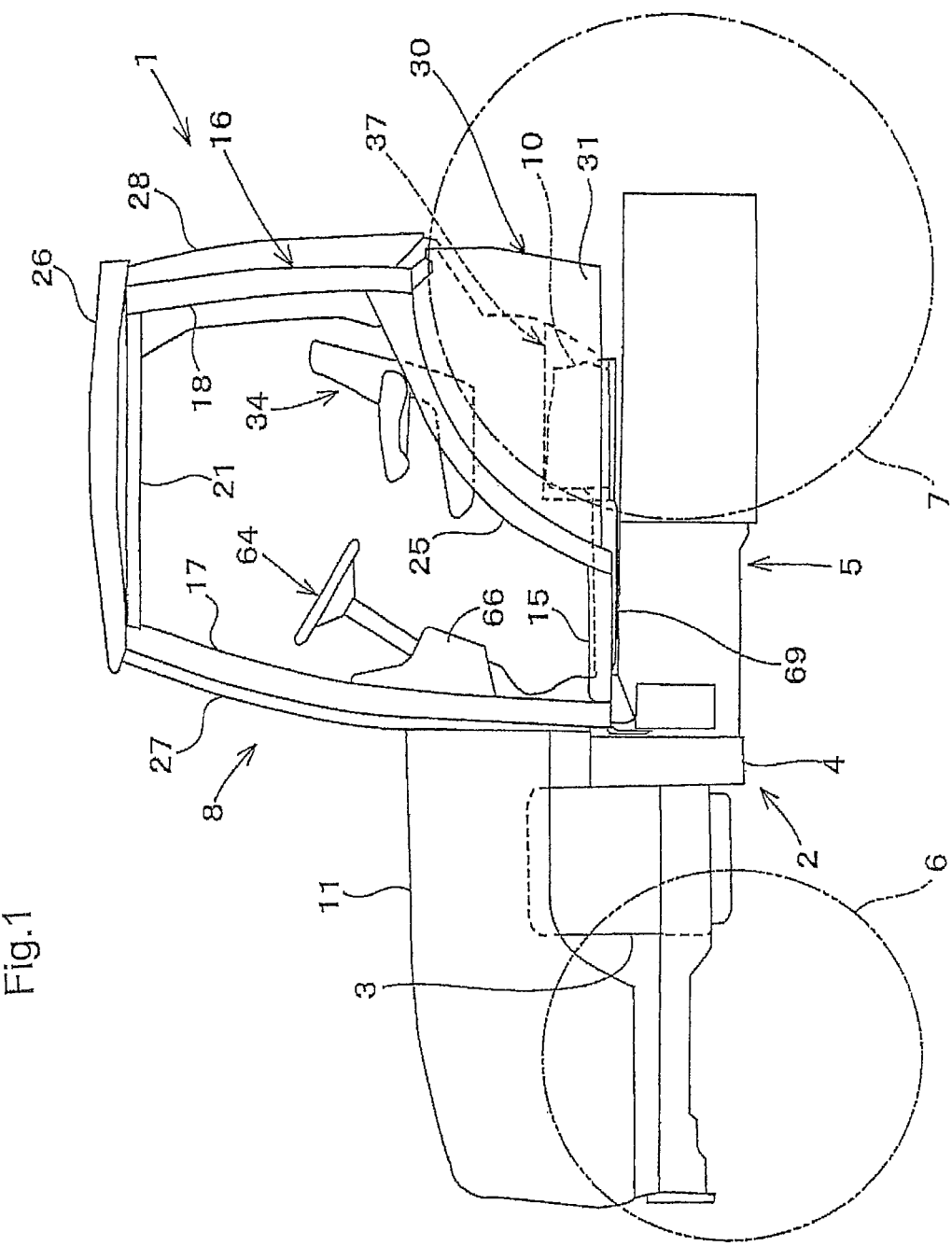
FIG. 1 is a side view of a tractor employing a cabin system according to the present invention.

FIG. 1 shows a tractor 1 employing this cabin system. A vehicle body 2 of this tractor 1 is an interconnected structure of a transmission case 5 disposed rearwardly of an engine 3, comprised of a flywheel housing 4, a clutch housing and a transmission case, etc. This vehicle body 2 is supported on right/left pairs of front and rear wheels 6, 7 to be capable of traveling. A cabin 8 is mounted on a rear portion of this vehicle body 2.

This tractor 1 mounts an air conditioning unit ("an air conditioner") for performing conditioning of air present inside the cabin 8. The air conditioning unit includes a cooling unit and a heating unit.

The cooling unit includes e.g. a compressor for compressing cooling medium, a condenser (heat discharger) for condensing/liquefying compressed cooling medium from the compressor while discharging heat therefrom, an expansion valve for depressurizing the cooling medium liquefied by the condenser to make readily evaporable, and an evaporator for vaporizing the cooling medium to absorb heat from the surrounding, thus cooling this surrounding.

The heating unit circulates heating medium by sending the heating medium heated by engine heat to a heater and returning the medium to the engine 3 side. The main constituent of the air conditioning unit is an air conditioner body 10 consisting of the evaporator, the heater, a blower and a casing. This air conditioner body 10 is disposed inside the cabin 8, with the compressor, the condenser, the expansion valve, etc. being disposed within a hood 11, for example.

First, with reference to FIGS. 2 through 16, there will be explained constructions and arrangements of an air distributing duct 6 extending forwardly and upwardly of the driver's seat, a relay duct 69 connecting this air distributing duct 67 to the air conditioner body 10, an inspection access opening 40 provided at right/left center of a front floor 36 constituting the floor face forwardly of the driver's seat.

Figure 10:
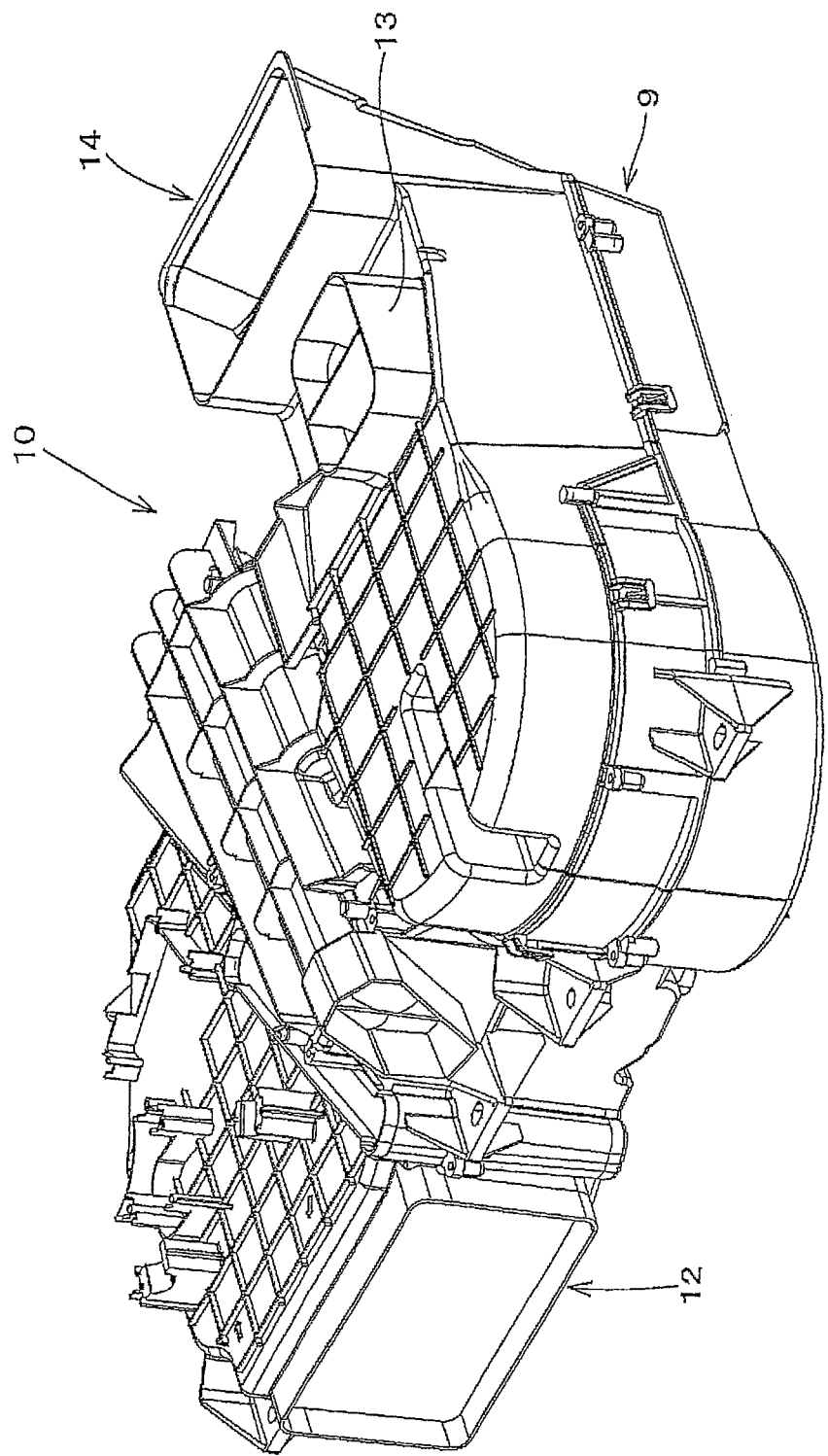
FIG. 10 is a perspective view of an air conditioner body.
Figure 11:
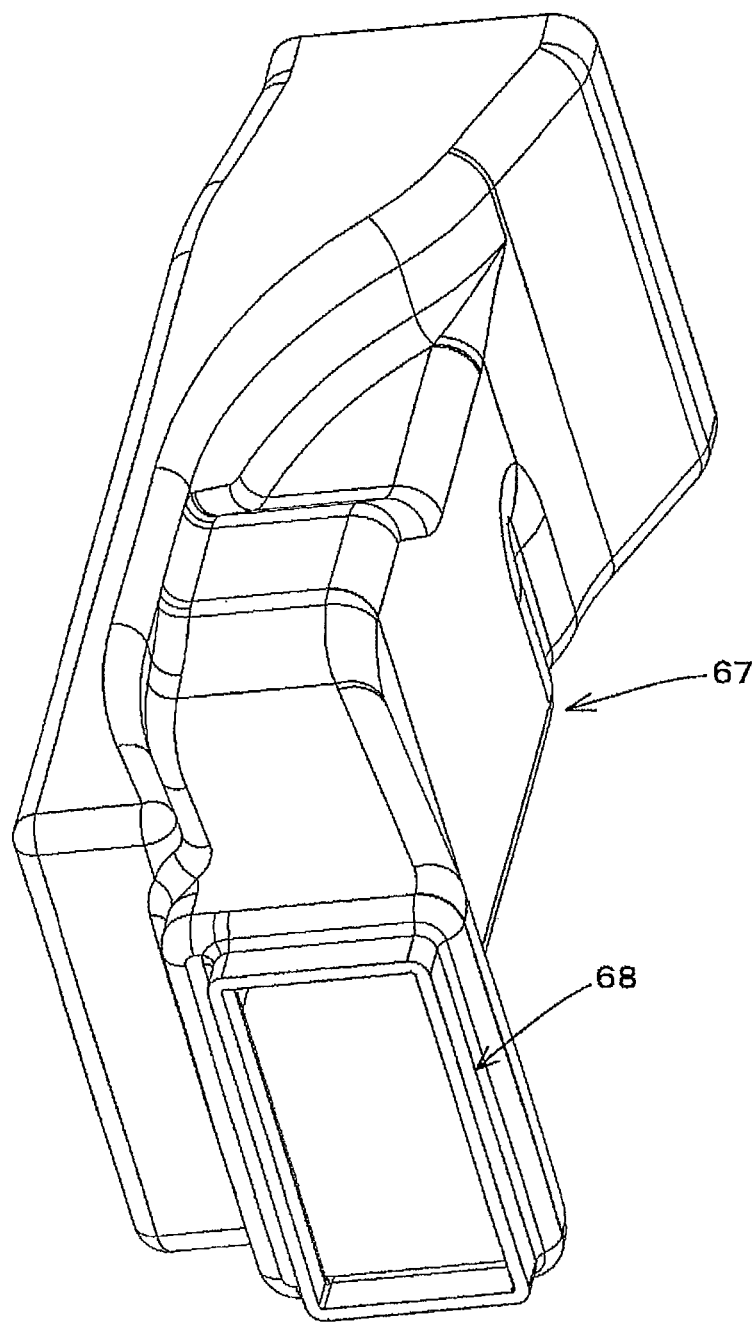
FIG. 11 is a perspective view of an air distributing duct.

The air conditioner body 10, as shown in FIG. 10, includes a rectangular shaped discharging opening 12 for discharging conditioned air on the right side of a front face of a casing 9. This discharging opening 12 is open toward the forward side.

On the left side of the rear portion in the upper face of the casing 9 of the air conditioner body 10, there are provided a pair of front and rear air introducing openings 13, 14. The front side air introducing opening 13 is provided as an ambient air introducing opening for introducing ambient air (air present outside the cabin 8) to the inside of the casing 9. The rear side air introducing opening 14 is provided as an indoor air introducing opening for introducing indoor air (air present inside the cabin 8) to the inside of the casing 9.

The ambient air introducing opening 13 introduces ambient air from an ambient air introducing opening provided in the roof of the cabin 8 through a duct. Whereas, the indoor air introducing opening 14 introduces the indoor air through an indoor air introducing duct with a filter provided upwardly of this indoor air introducing opening 14.

It is to be noted that the air conditioner unit 10 may be of any type available, so long as it includes at least an evaporator and a blower.

Figure 2:
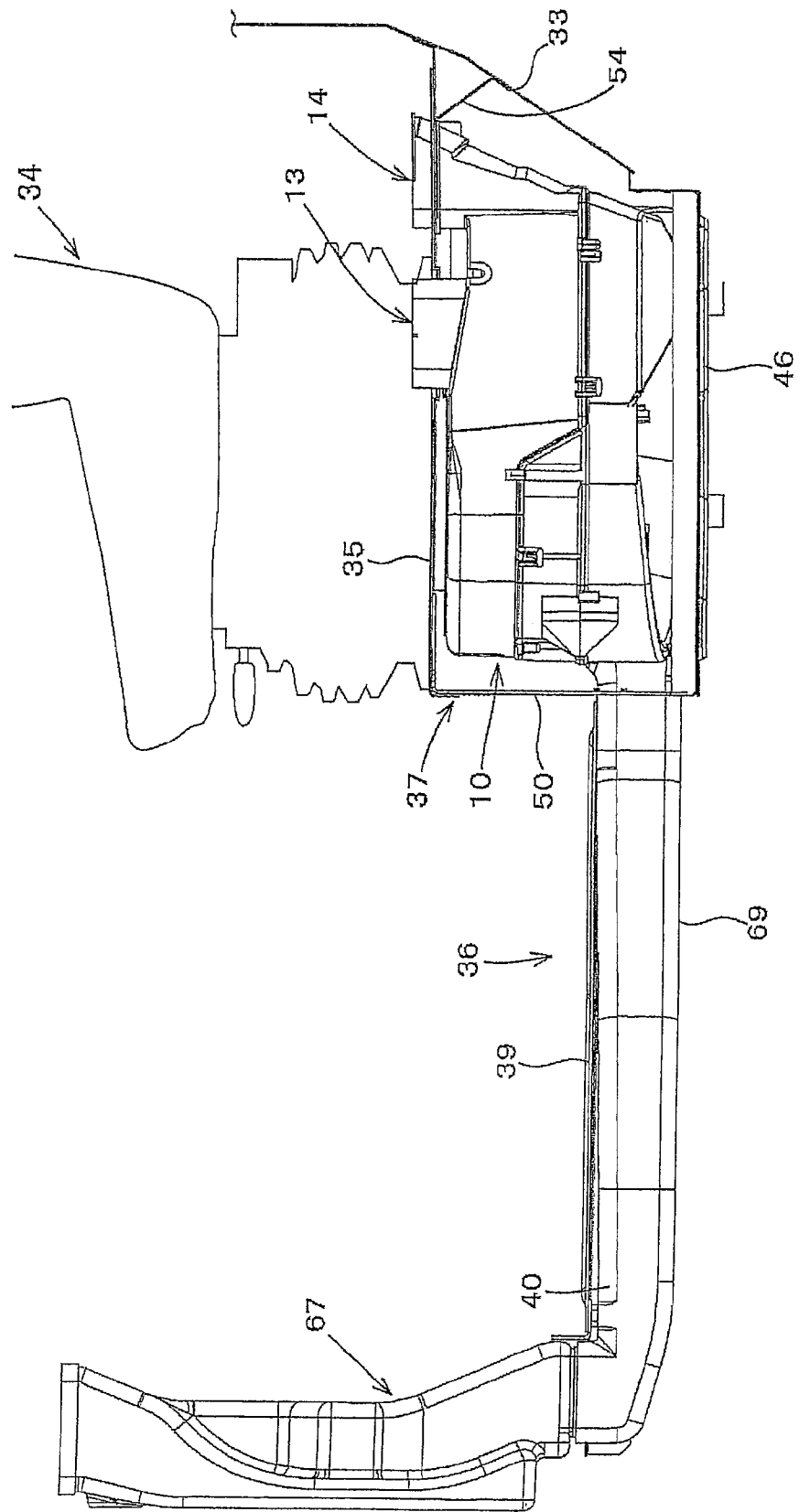
FIG. 2 is a side view of principal portions of the cabin system.
Figure 3:
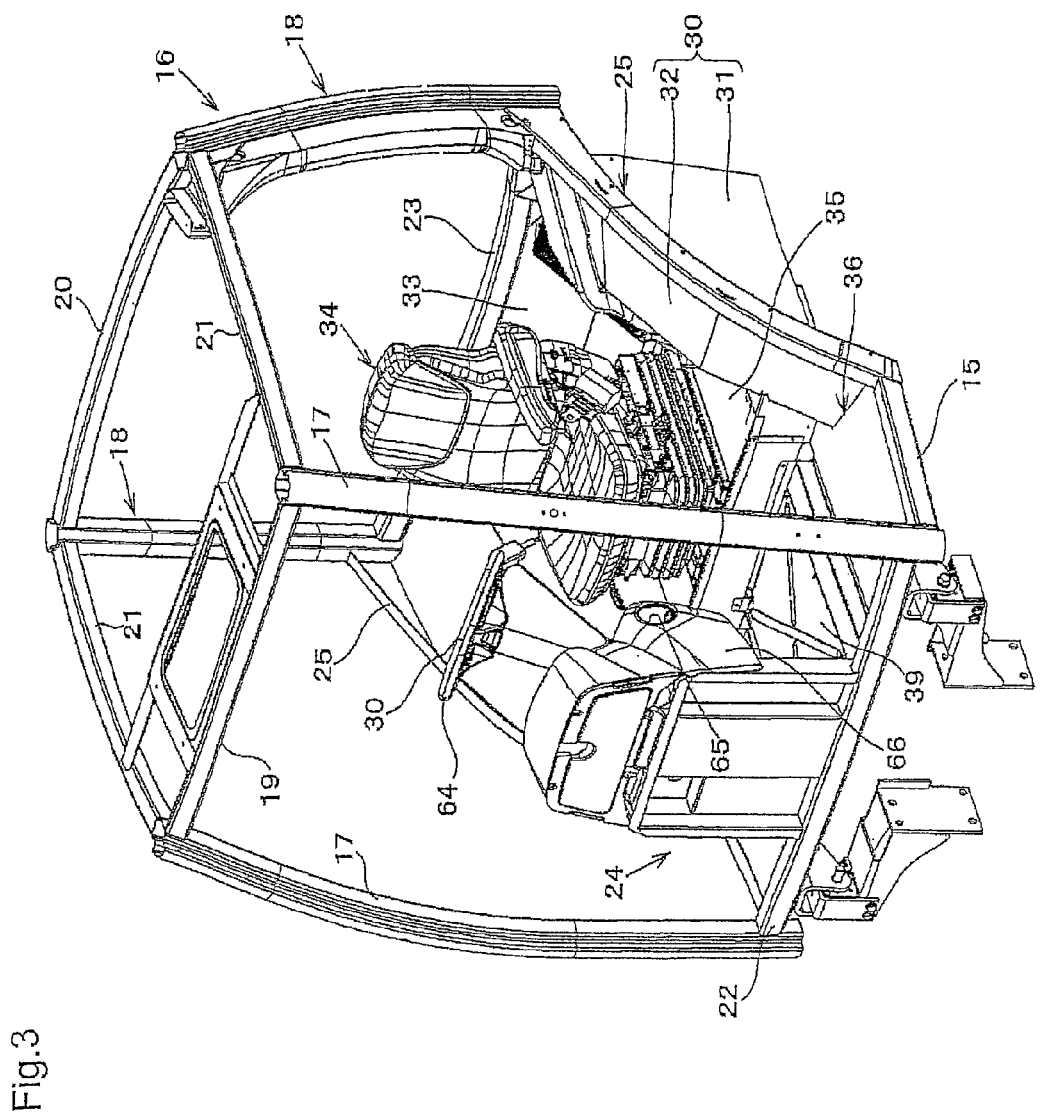
FIG. 3 is a perspective view showing a cabin frame etc. as seen from the left front side.
Figure 4:
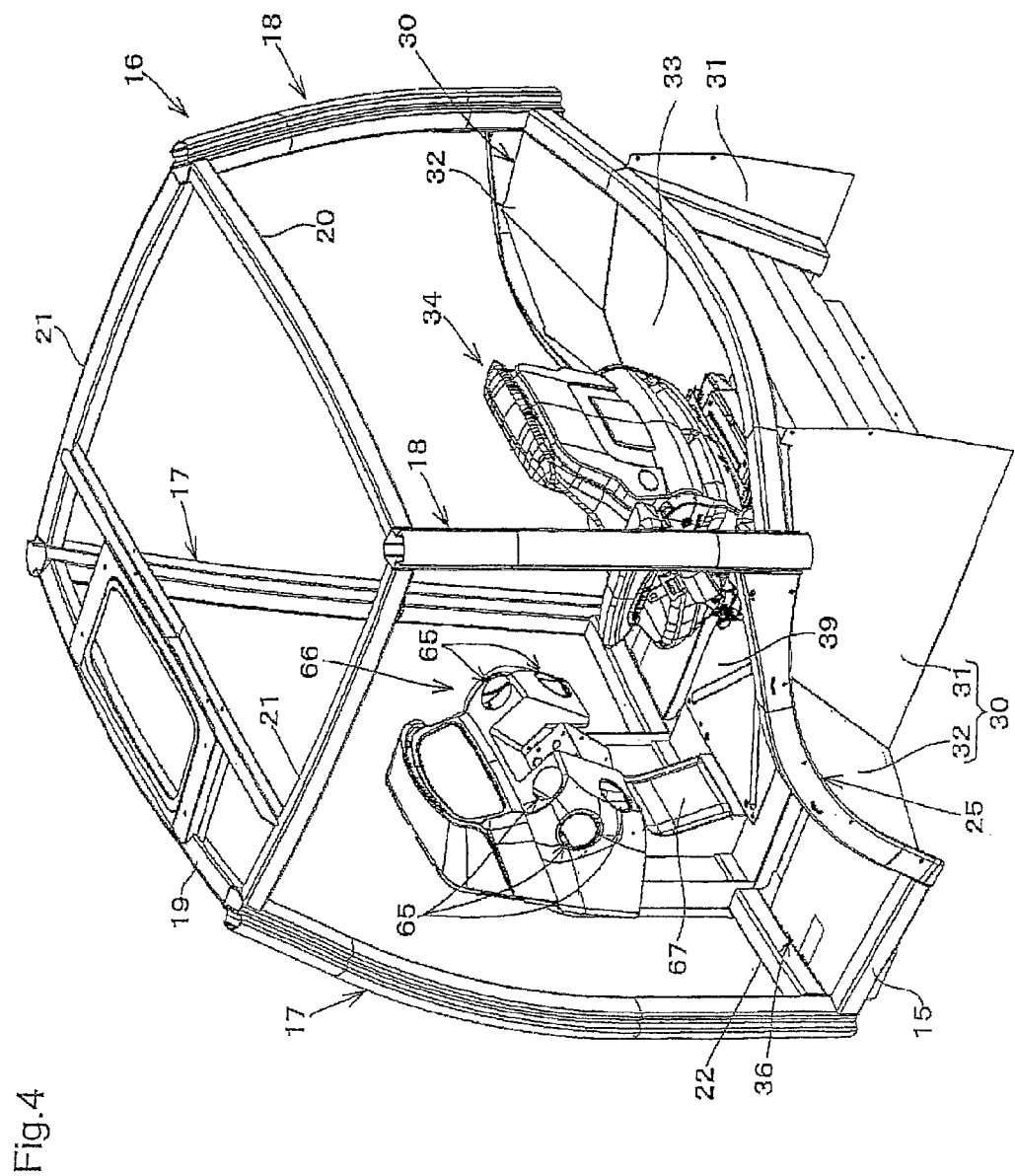
FIG. 4 is a perspective view showing the cabin frame etc. as seen from the left rear side.

The cabin 8 includes a cabin framework 16. This cabin framework 16, as shown in FIG. 2, FIG. 3 and FIG. 4, includes a pair of right/left front pillars 17 disposed on the front side and a pair of right/left rear pillars 18 disposed on the rear side. The upper end heights of the right/left rear pillars 18 are set substantially same as the upper end heights of the right/left front pillars 17; and the lower end heights of the right/left rear pillars 18 are set at positions corresponding to the vertical intermediate portions of the right/left front pillars 17.

The upper ends of the right/left front pillars 17 are connected to each other via a front upper beam 19. The upper ends of the right/left rear pillars 18 are connected to each other via a rear upper beam 20. Further, the upper ends of the front pillar 17 and the rear pillar 18 on a same right/left side are connected to each other via a side upper beam 21.

The lower ends of the right/left front pillars 17 are connected to each other via a front lower beam 22. The lower ends of the right/left rear pillars 18 are connected to each other via a rear lower beam 23.

At a lower portion between the right/left front pillars 17, there is mounted erect a front frame 24 at the right/left center portion of the front lower beam 22, the front frame 24 partitioning between the inside (indoor space) of the cabin 8 and the inside of the hood 11.

At lower portions of the right/left side faces of the cabin 8, there are provided side frames 25 extending from the lower ends of the rear pillars 18 to the bottom face of the cabin 8. Each right/left side frame 25 is curved in the form of arch convex toward the front and upper side. The rear end of the side frame 25 is connected to the lower end of the corresponding rear pillar 18 and the lower end of the side frame 25 is connected to the lower end of the corresponding rear pillar 18 via the side lower beam.

On the upper face of the cabin framework 16, a roof 26 is mounted. And, between the right/left front pillars 17, a front windshield 27 is provided. Between the right/left rear pillars 18, a rear windshield 28 is provided. And, between the front pillar 17 and the rear pillar 18 on the same right/left side, a door is provided.

Further, at rear lower portions of the right/left opposed sides of the cabin framework 16, there are provided rear wheel fenders 30, each forming a tire housing for the rear wheel 7. This rear wheel fender 30 includes; a vertical wall 31 disposed on the inner side in the right/left direction of the side frame 25 so as to cover an right/left inward side of the rear wheel 7 (one side of the rear wheel 7 facing a right/left center of the cabin 8); and a peripheral wall 32 disposed between the vertical wall 31 and the side frame 25 and along this side frame 25 so as to cover the outer periphery of the rear wheel 7.

Downwardly of the rear lower beam 23 of the cabin framework 16, the space between the right/left rear wheel fenders 30 is closed with a back plate 33. At a rear portion inside the cabin 8, a driver's seat 34 is provided. This driver's seat 34 is disposed on a rear floor 35 formed of a plate provided between the lower portions of the vertical walls 31 of the right/left rear wheel fenders 30.

As shown in FIG. 1, the above-described rear floor 35 is disposed at a position one step higher than a front floor 36 (step) constituting the floor face forwardly of the driver's seat 34 (the front side of the bottom of the cabin 8).

Further, under the driver's seat 34, there is provided an air conditioner accommodating chamber 37 partitioned by the rear floor 35, and the air conditioner body 10 is accommodated in this air conditioner accommodating chamber 37.

The above-described front floor 36, as shown in FIGS. 3 through 8 and FIG. 14, is provided to extend between the air conditioner body accommodating chamber 37 and the front lower beam 22 from the space between the lower ends of one right/left front pillar 17 and side frame 25 on one right/left side to the space between the lower ends of the other right/left front pillar 17 and side frame 25 on the other right/left side.

The front floor 36 is constituted mainly from right/left fixed floor plates 38 fixed to the cabin framework 16; and an inspection access opening closing plate 39 which is disposed at the right/left center and detachably attachable to the fixed floor plates 38.

The right/left fixed floor plates 38 are spaced apart from each other in the right/left direction, so that the space between these right/left fixed plates 38 forms an inspection access opening 40 for providing access for inspection of the lower side (vehicle body 2) of the cabin 8. The inspection access opening closing plate 39 is detachably attached from the upper side to the right/left fixed floor plates 38 in such a manner as to close this inspection access opening 40. Each right/left fixed floor plate 38 includes an outer stepped portion 41 on the right/left outer side, a mounting portion 42 on the right/left inner side, and a groove portion 43 between the outer stepped portion 41 and the mounting portion 42.

The mounting portion 42 has a greater height than the outer stepped portion 41 and the groove portion 43 is formed along the fore/aft direction.

At the front portion of the mounting portion 42 of the right fixed floor plate 38, there is provided an extension wall 44 extending toward the inner side in the right/left direction. At the front portion of the mounting portion 42 of the left fixed floor plate 38, there is fixedly welded an attaching plate 45 as a member extending toward the inner side in the right/left direction and this attaching plate 45 has an L-shape consisting of a lower wall 45a and a front wall 45b extending upward from the front end of the lower wall 45a.

The lower wall 45a of this attaching plate 45 is placed in abutment against the rear portion of the extension wall 44 and fixedly welded to this extension wall 44.

The rear sides of the extension wall 44 and the attaching plate 45 together form the inspection access opening 40. The inspection access opening closing plate 39 has a rectangular shape in its plan view and right/left ends thereof are mounted on the mounting portions 42 of the right/left fixed floor plates 38 and bolt-fixed to these mounting portions 42 from the upper side (the indoor side of the cabin 8). Further, the front end of the inspection access opening closing plate 39 is placed on the extension wall 44 and the lower wall 45a of the attachment plate 45 and bolt-fixed to the extension wall 44 from the upper side (the indoor side of the cabin 8).

Downwardly of the rear floor 35, a bottom plate 46 is provided. This bottom plate 46 is disposed more downwardly than the front floor 36 and at the rear end of this bottom plate 46, there is provided a vertical wall 47 extending upward. And, at the upper end of this vertical wall 47, there is provided an extension piece 48 extending rearward from this upper end. And, the rear end of this extension piece 48 is fixedly welded to the lower end of the back plate 33.

The air conditioner body accommodating chamber 37, as shown in FIG. 1, FIGS. 5-8, FIGS. 13-16, has its upper face constituted mainly from the rear floor 35 and its bottom face constituted mainly from the lower bottom plate 46 and has its right/left faces constituted mainly from the lower portions of the vertical walls 31 of the rear wheel fenders 30. Further, its front face is constituted mainly from a front fixed panel 49 and the detachably attachable cover plate 50 and its rear face is constituted mainly from the lower portion of the back plate 33.

To the front end of the rear floor 35, there is attached along the entire right/left width thereof, an engaging wall 35a extending downward from this front end. Further, at the left rear portion of the rear floor 35, there are formed an angular hooked shape (one-side removed rectangular shape) cutout portion 52 for allowing insertion of the ambient air introducing opening 13 of the air conditioner body 10 and a rectangular shaped insertion hole 53 for allowing insertion of the indoor air introducing opening 14.

The rear end of the rear floor 35 is placed on a supporting member 54 fixedly attached to the back plate 33 and is bolt-fixed to this supporting member 54 from the upper side.

The front fixed panel 49 is disposed on the rear and side of the front floor 36 and extends between the vertical walls 31 of the rear wheel fenders 30. And, this panel 49 is fixedly welded to the right/left fixed floor plates 38 and the vertical walls 31 of the right/left rear wheel fenders 30.

At the lower end of this front fixed panel 49, there is provided a bent piece 55 bent toward the rear side and this bent piece 55 is fixedly welded to the front end of the bottom plate 46 and this front fixed panel 49 is mounted erect at the front end of the bottom plate 46.

The front fixed panel 49 includes right/left end side wall portions 56 and a center wall portion 57 at the right/left center. The upper ends of the right/left end side wall portions 56 are located higher than the upper end of the center wall portion 57.

With the above arrangement, an opening 59 is formed between the upper portions of the right/left end side wall portions 56 of the front fixed panel 49.

A duct inserting opening 58 is formed with an offset to the right side from the right/left center of the center wall portion 57. This duct inserting opening 58 is formed continuously with the opening 59 formed between the upper portions of the right/left end side wall portions 56.

Between the center wall portion 57 and each one of the right/left end side wall portion 56, there is formed a groove portion 61 continuous with the above-described opening 59. This groove portion 61 is disposed at the position corresponding to the groove portion 43 of the fixed floor plate 38 of the front floor 36.

Through the above-described groove portions 43, 61, hoses and electric wires to be connected to the air conditioner body can be laid out.

At the upper end of each right/left end side wall portion 56, there is formed an attaching wall 60 extending rearward from this upper end; and the right/left sides of the front end of the rear floor 35 are bolt-fixed to these right/left attaching walls 60. Further, the right/left sides of the engaging wall 35a of the rear floor 35 are disposed with a space formed forwardly of the end side wall portion 56.

The inspection access opening closing plate 39 is disposed at a position lower than the upper end of the center wall portion 57 of the front fixed panel 49, and the upper end of this center wall portion 57 projects upward beyond the inspection access opening closing plate 39.

The front cover plate 50 is disposed so as to close the opening 59 between the upper portions of the end side wall portions 56.

The right/left ends of this front cover plate 50 are superposed on the front faces of the right/left side end wall portions 56 of the front fixed panel 49 and the upper end is superposed on the rear face of the engaging wall 35a of the rear floor 35 and its lower end is superposed on the front face of the upper end of the center wall portion 57 of the front fixed panel 49.

Figure 5:
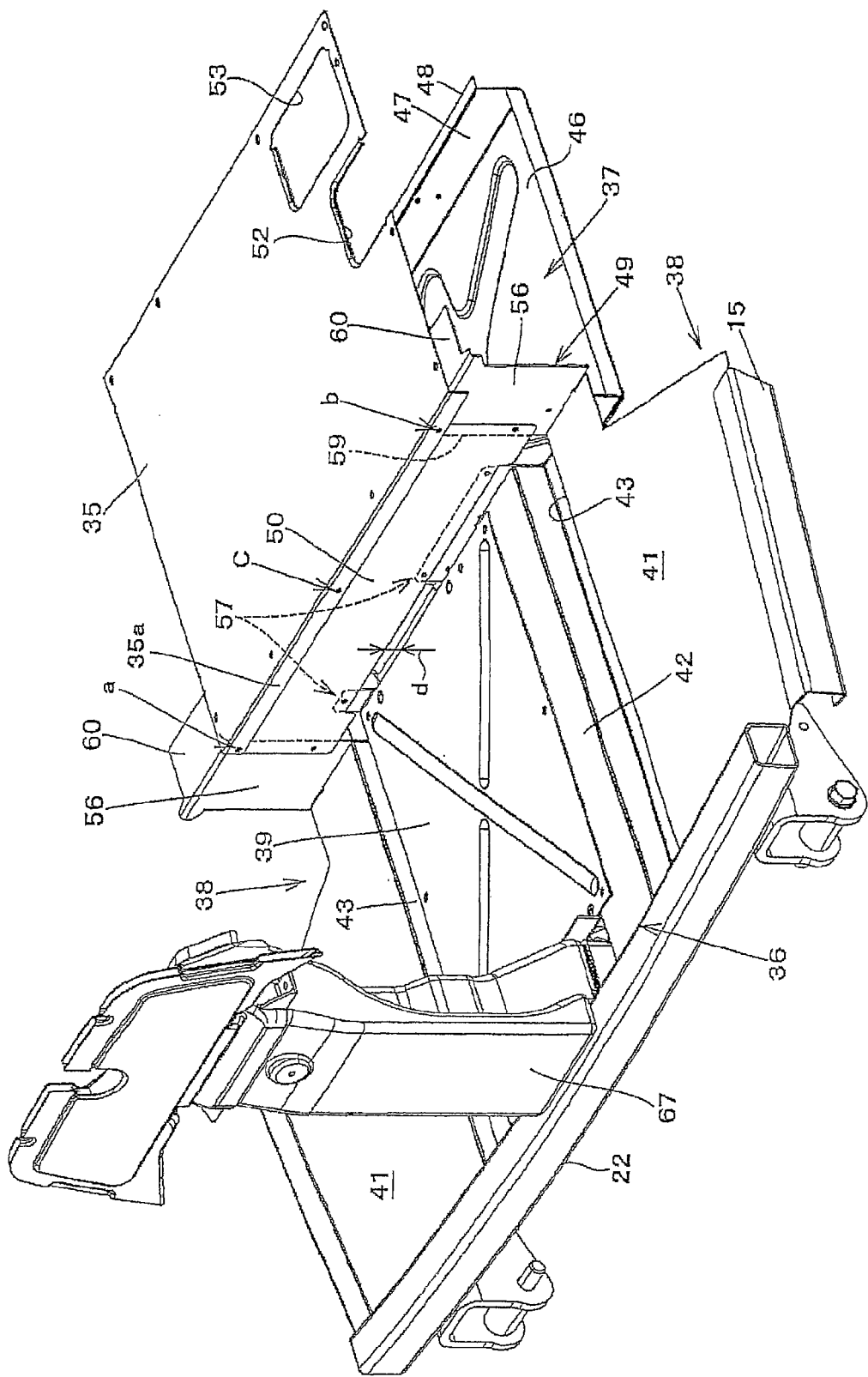
FIG. 5 is a perspective view of principal portions of the cabin system.
Figure 6:
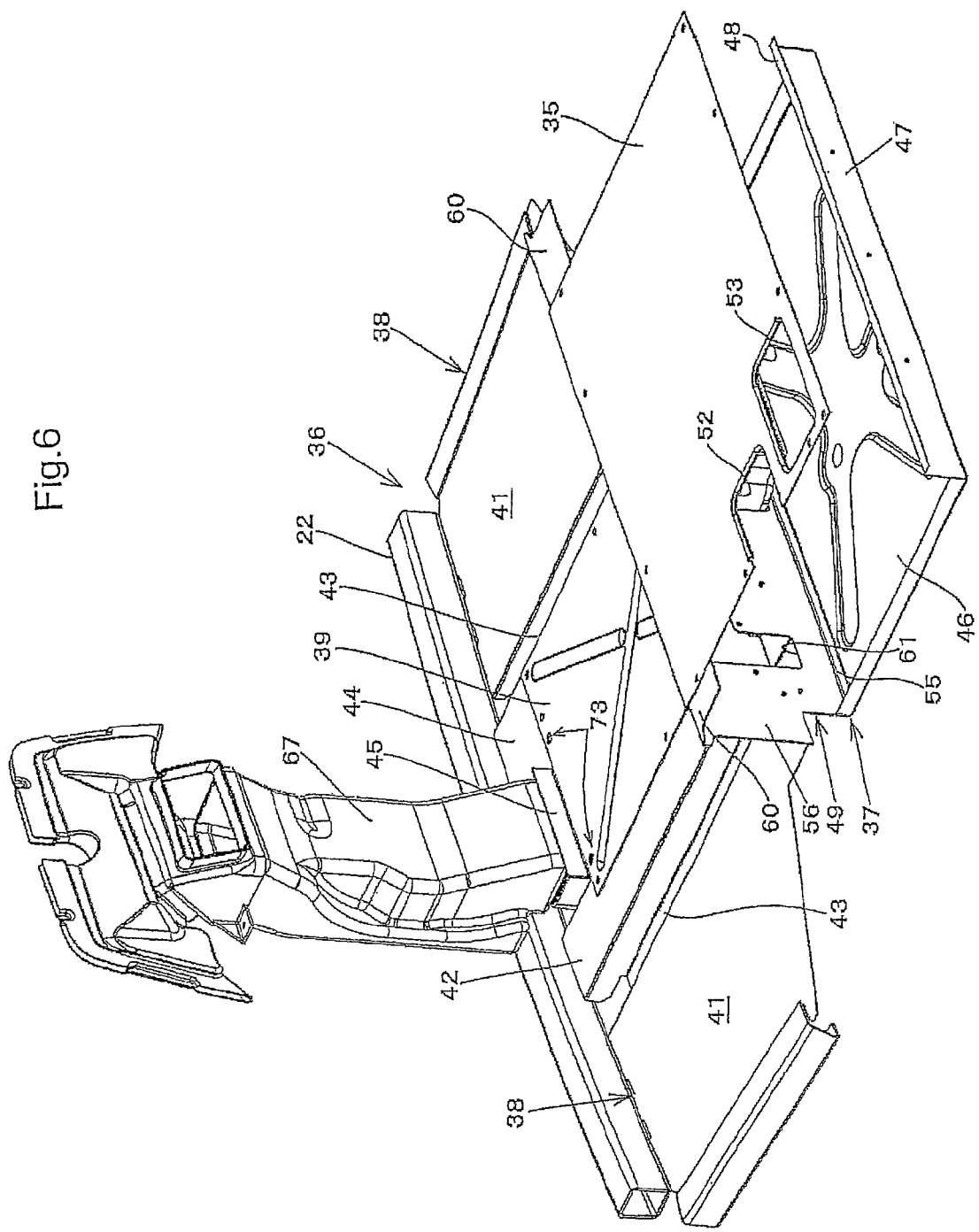
FIG. 6 is a perspective view of principal portions of the cabin system.
Figure 7:
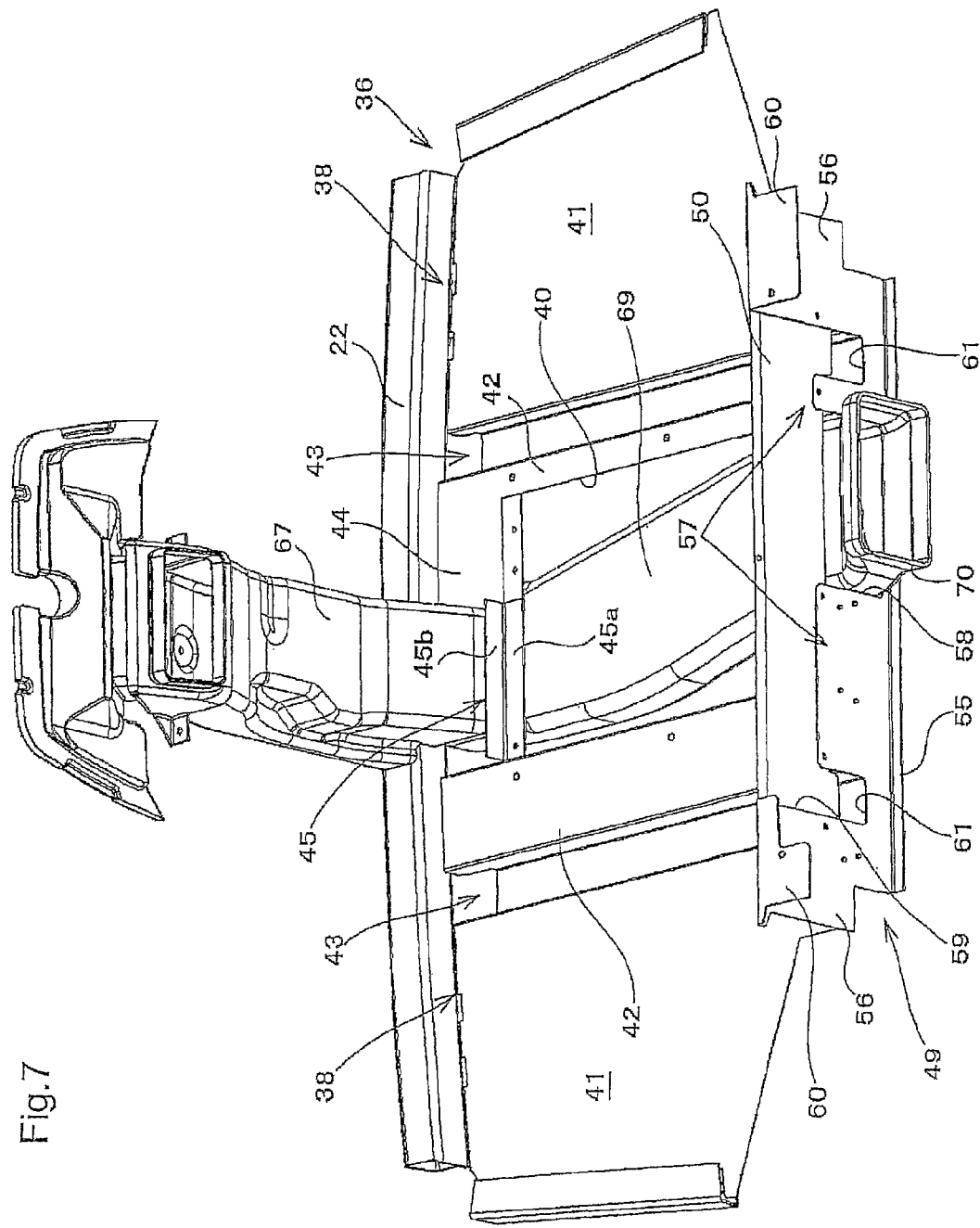
FIG. 7 is a perspective view of principal portions of the cabin system.

The upper end of the front cover plate 50, as shown in FIG. 5, is fixed, at a position (a) and a position (b), by means of bolts that extend through the engaging wall 35a of the rear floor 35 and the right/left side end wall portions 56 of the front fixed panel 49 and also is fixed, at a position (C), by means of a bolt that extends through the engaging wall 35a of the rear floor 35 and the front cover plate 50. With these, even if the front cover plate 50 is formed of a thin plate, the rigidity thereof as a portion of a supporting deck for supporting the driver's seat 34 can be maintained.

Also, the front cover plate 50 has its lower end bolt-fixed to the right/left side end wall portions 56 and the center wall portion 57 of the front fixed panel 49.

This front cover plate 50 has a gap (d) relative to the inspection access opening closing plate 39 to allow its lower movement by its overlapping amount with the engaging wall portion 35a of the rear floor 35.

Therefore, by removing the bolt fixing the front cover plate 50 and then lowering this plate 50 by the overlapping amount with the engaging wall portion 35a of the rear floor 35, the front cover plate 50 can be removed to the forward side.

And, with the removal of the front cover plate 50, a simple inspection of the air conditioner body 10 is made possible through the opening 59.

Further, by removing the driver's set 34 and also the rear floor 35, an easy access to the air conditioner body 10 is provided. And, by removing the rear floor 35 and the front cover plate 50, attachment/detachment of the air conditioner body 10 can be readily performed when this air conditioner body 10 is to be replaced or repaired.

Figure 13:
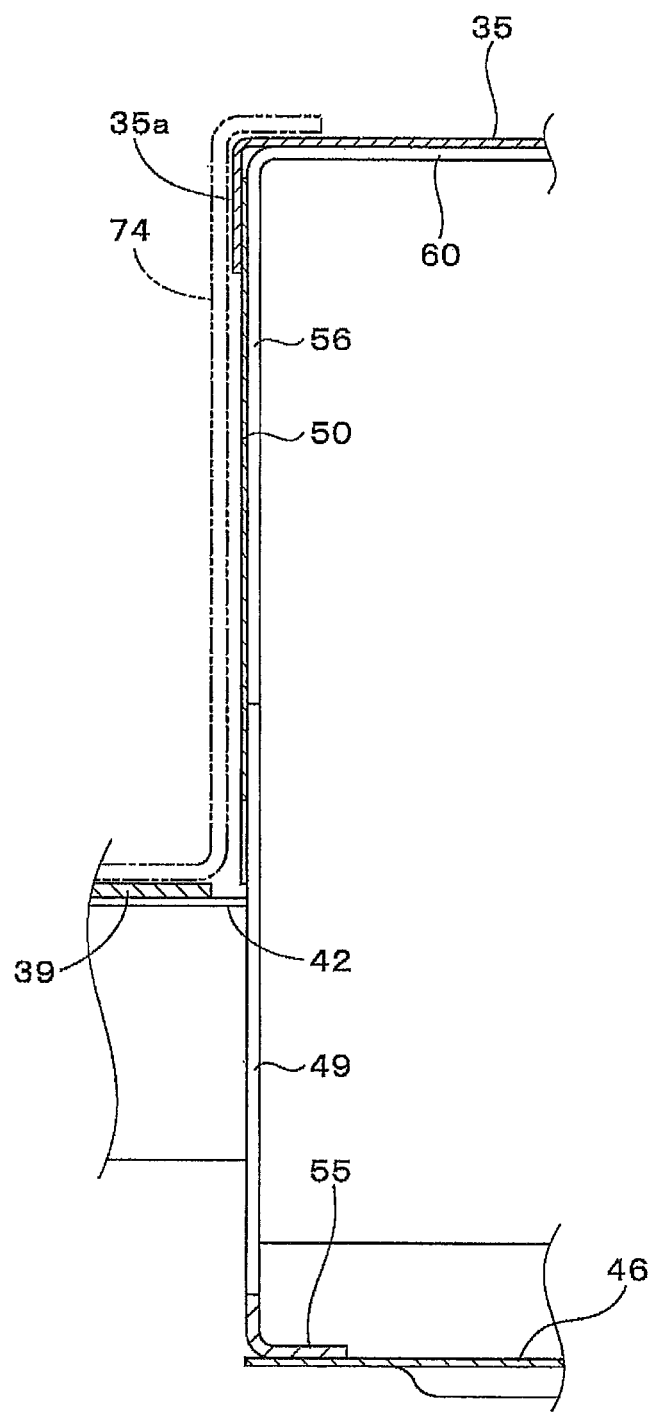
FIG. 13 is a side view in section showing a front portion of an air conditioner body accommodating chamber.
Figure 14:
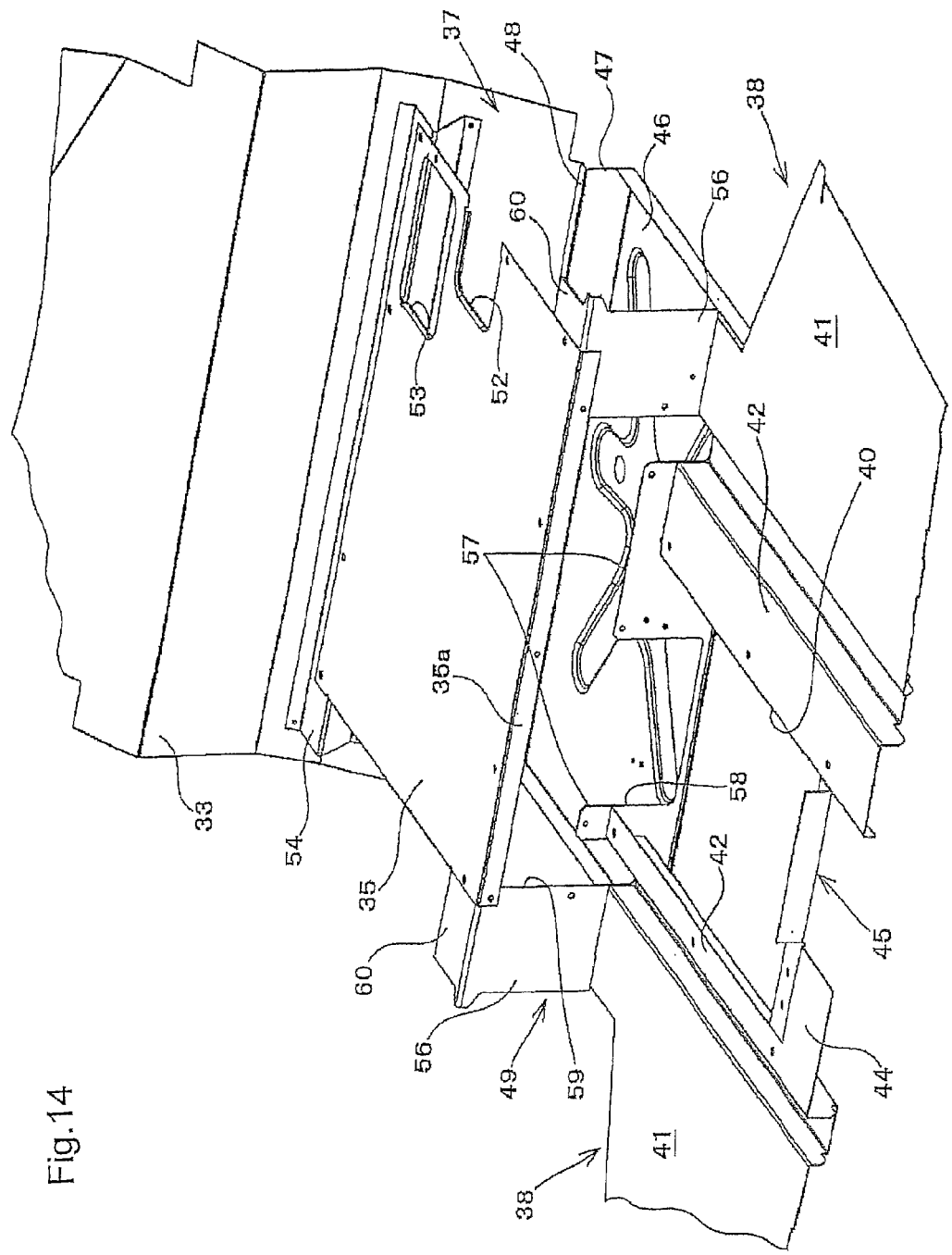
FIG. 14 is a view showing principal portions of the cabin system.
Figure 15:
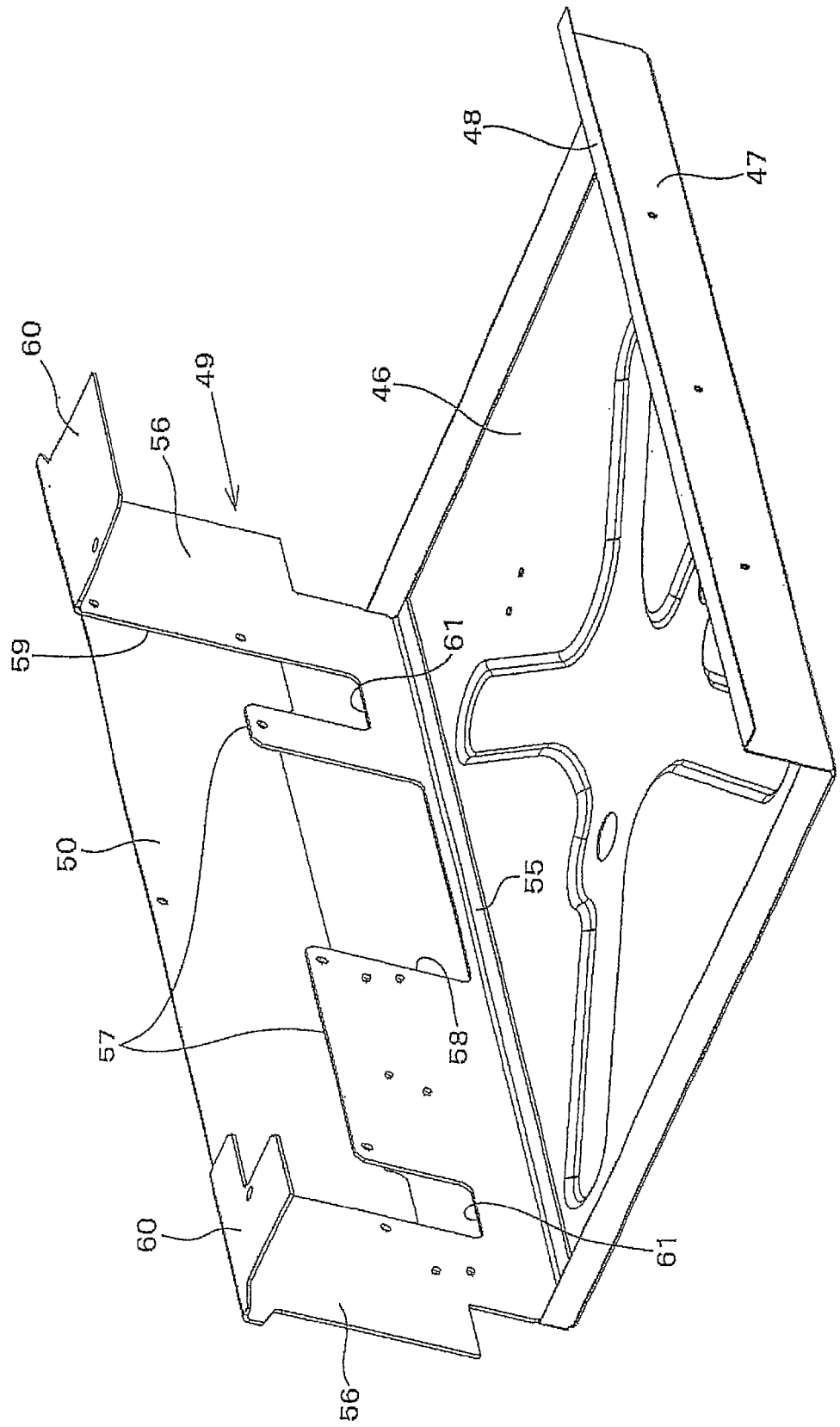
FIG. 15 is a rear perspective view of the air conditioner body accommodating chamber.

Incidentally, as shown in FIG. 13, an upper end of a floor mat 74 to be placed over the upper face of the front floor 36 is extended upward so as to cover the front face of the air conditioner body accommodating chamber 37. With this, the gap formed downwardly of the front cover plate 50 is closed.

Regarding the rear floor 35, its front end is bent to provide the engaging wall 35a. With this, sufficient strength of this rear floor 35 as a supporting member for supporting the driver's seat 34 can be secured even when the front cover plate 50 is removed. Further, with the provision of this engaging wall 35a, there is obtained a further advantage as follows. Namely, if one simply brings the front cover plate 50 into contact with the front fixed panel 49 and the engaging wall 35a from the front side and desires to bolt-fix the front cover plate 50 to these members, because of the step or space in the front/rear direction between the front fixed panel 49 and the engaging wall 35a, it becomes necessary to configure the front cover plate 50 into a stepped shape. On the other hand, according to the above-described embodiment, since the right/left opposed ends of the upper end of the front cover plate 50 are fitted into between the end side wall portions 56 and the engaging wall 35a of the front fixed panel 49, there is no need for forming the front cover plate 50 in the stepped shape. Further, as the front cover plate 50 is downwardly movable by the amount of overlapping with the engaging wall 35a of the rear floor 35, this front cover plate 50 can be easily attached/detached from the front side.

Figure 16:
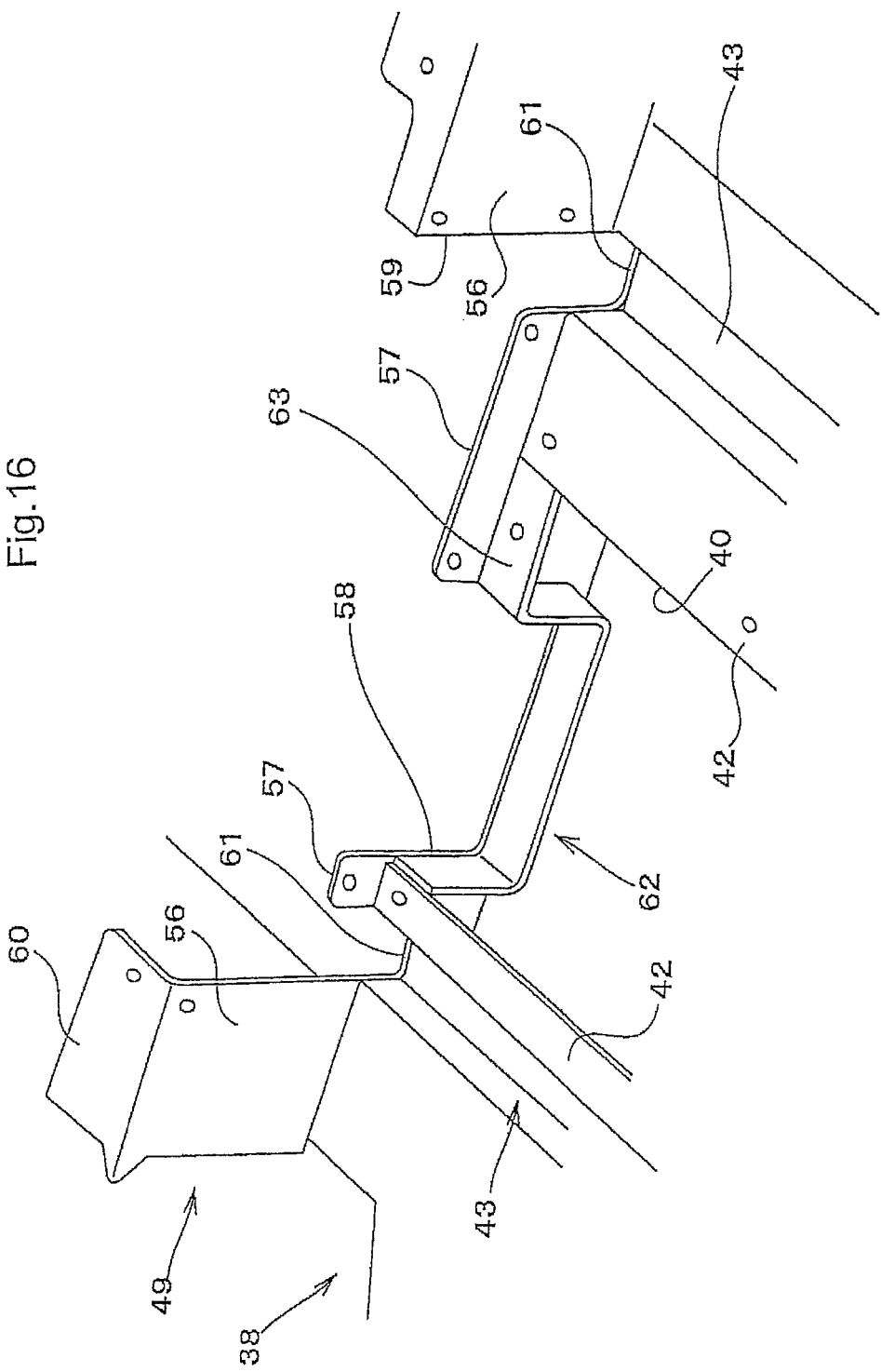
FIG. 16 is a perspective view showing the periphery of a duct inserting opening.

As shown in FIG. 16, to the front fixed panel 49, there is fixedly welded a duct receiver 62 having an upwardly open angular hooked shape along the duct inserting opening 58.

This duct receiver 62 integrally forms a mounting piece 63 extending upward to the left side from the upper end of the vertical wall 31 of the left rear wheel fender 30, and the inspection access opening closing plate 39 is mounted on the mounting piece 63 and bolt-fixed to this the mounting piece 63.

In a front portion inside the cabin 8 (forwardly of the driver's seat 34), a steering wheel 64 is provided and also a front cover 66 having a plurality of indoor air discharging openings 65 is provided. The steering wheel 64 and the front cover 66 are supported to the front frame 24 and the front cover 66 is mounted on top of the front frame 24.

The front cover 66 has a hollow interior and each indoor air discharging opening 65 is attached with an air flow direction changing grill capable of changing the direction of the air flow.

Further, to the rear face of the front frame 24, there is supported an air distributing duct 67 vertically extending and having its upper end communicated to the inside of the front cover 66.

The lower end of this air distributing duct 67 is disposed forwardly of an attaching plate 45 fixed to the front portion of the mounting portion 42 of the left fixed floor plate 38 and this lower end is exposed under the front floor 36.

At the lower end of this air distributing duct 67, there is provided a lower end connecting opening 68 opened to the downward side and having a rectangular shape.

Figure 8:
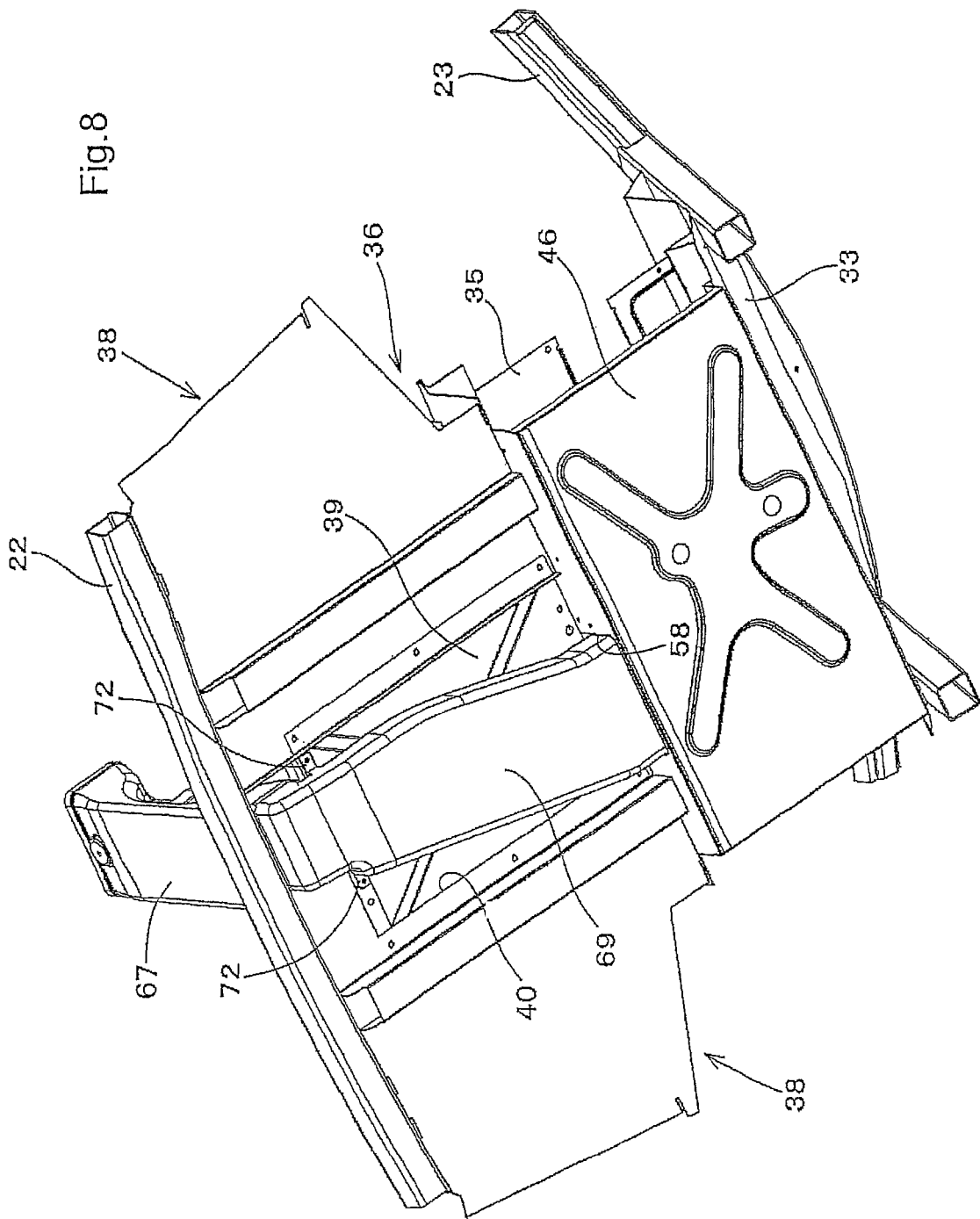
FIG. 8 is a perspective view of principal portions of the cabin system.
Figure 9:
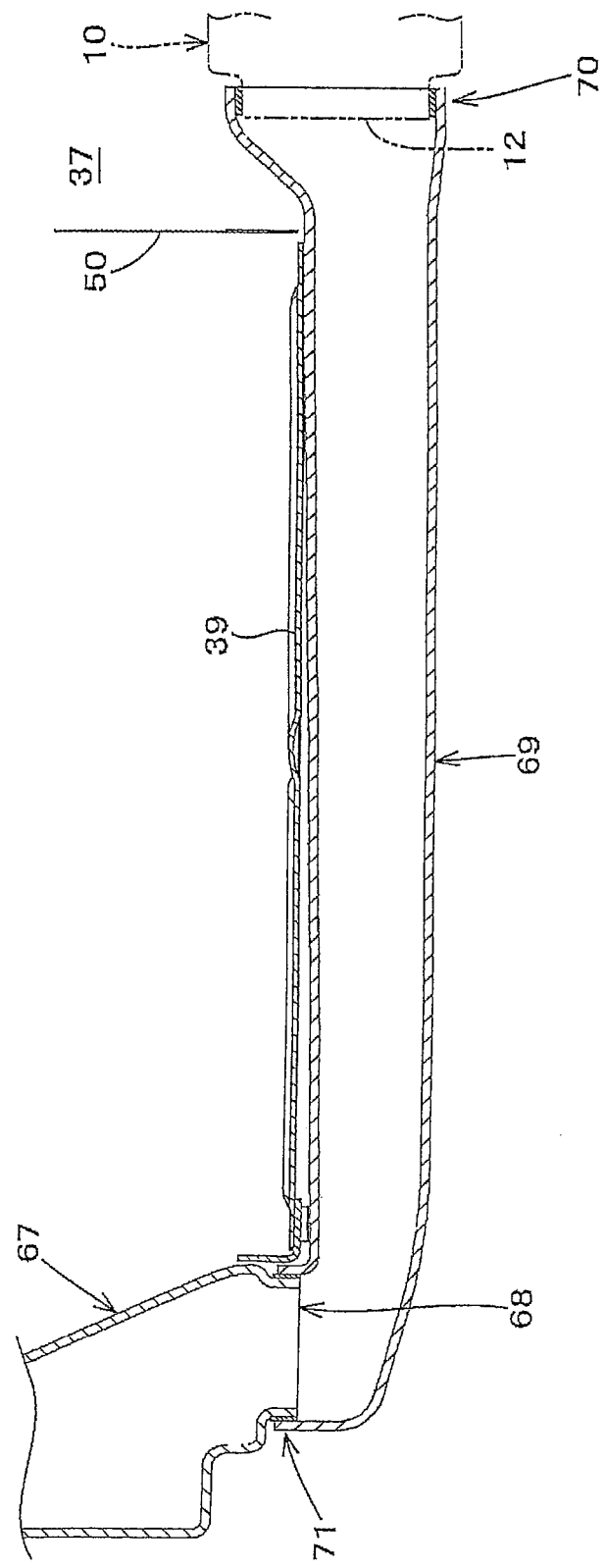
FIG. 9 is a side view in section showing a connection condition of a relay duct.

As shown in FIG. 1, FIG. 8 and FIG. 9, the air discharging opening 12 of the air conditioner body 10 and the lower connecting opening 68 of the air distributing duct 67 are connected to each other via a relay duct 69. This relay duct 69 is disposed to extend from the discharging opening 12 of the air conditioning body 10 via the right/left center of the front floor 36 and the underside of the front floor 36 to the lower end of the air distributing duct 67.

Therefore, an amount of conditioned air discharged from the discharging opening 12 of the air conditioner body 10 is distributed through the relay duct 69 and the air distributing duct 67 to the inside of the front cover 66 and then through the indoor air discharging openings 65 to the inside of the cabin 8.

Figure 12:
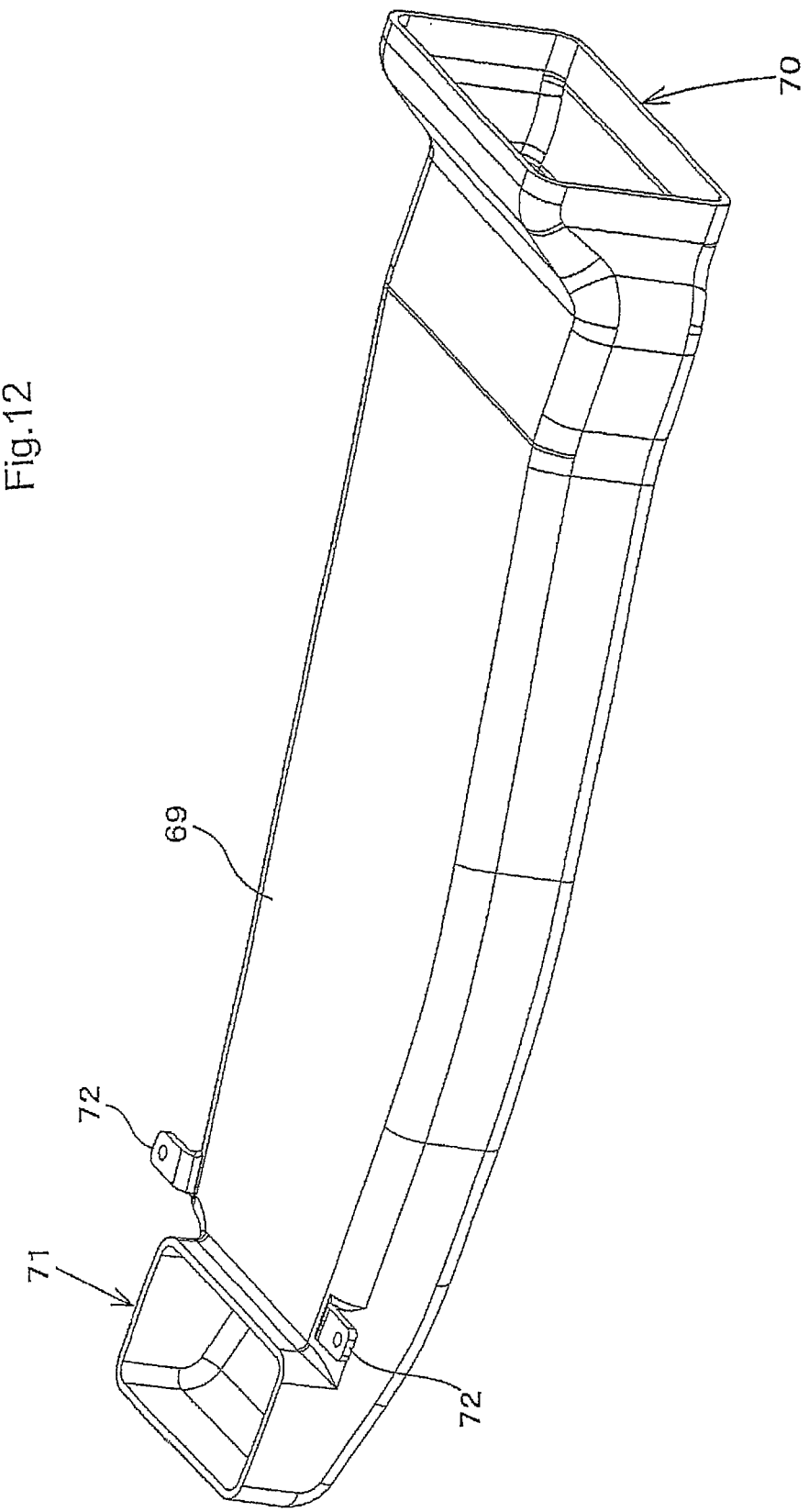
FIG. 12 is a perspective view of the relay duct.

The relay duct 69, as shown also in FIG. 12, is formed like a cylindrical member having a flat shape wide in the right/left direction and elongate in the front/rear direction.

At the rear end of this relay duct 69, there is provided a rear end connecting opening 70 open toward the rear side and having a rectangular shape. This rear end connecting opening 70 is formed such that its upper face is disposed higher than the upper face of the main body portion of this relay duct 69.

Further, the front end of the relay duct 69 is bent upward and at this front end, there is provided a front end connecting opening 71 open upward and having a rectangular shape.

This relay duct 69 is disposed downwardly of the inspection access opening closing plate 39, and the rear end connecting opening 70 of the relay duct 69 is inserted through the duct inserting opening 58 into the air conditioner body accommodating chamber 37 to engage outwardly with the discharging opening 12 of the air conditioner body 10 from the front side, thus being connected to the discharging opening 12 of this air conditioner body 10.

The rear portion of this relay duct 69 is supported by the duct receiver 62 provided around the discharging opening 12 of the air conditioner body 10 and the duct inserting opening 68.

Also, between the duct receiver 62 and the relay duct 69, a sealing member is provided and a sealing member is provided also between the inspection access opening closing plate 39 and the relay duct 69. With these, intrusion of ambient air from the outside of the cabin 8 to the inside thereof is prevented.

Further, the front end connecting opening 71 of the relay duct 69 is engaged outwardly with the lower end connecting opening 68 of the air distributing duct 67 from the lower side, thus being connected to this lower end connecting opening 68 of the air distributing duct 67.

The connection of the front end connecting opening 71 of the relay duct 69 to the lower end connecting opening 68 of the air distributing duct 67 is made possible with the rear end connecting opening 70 of the relay duct 68 being kept connected to the discharging opening 12 of the air conditioner body 10.

Incidentally, sealing members are provided between the discharging opening 12 of the air conditioner body 10 and the rear end connecting opening 70 of the relay duct 69 and between the lower end connecting opening 68 of the air distributing duct 67 and the front end connecting opening 71 of the relay duct 69, respectively.

Further, the front connecting opening 71 of the relay duct 69 can be connected to the lower connecting opening 68 of the air distributing duct 67 from the lower side. Such connection may be made by vertical abutment via a sealing member of the upper face of the front end connecting opening 71 of the relay duct 69 and the lower face of the lower end connecting opening 68 of the air distributing duct 67.

Moreover, at the front portion of the relay duct 69, a pair of right/left attaching pieces 72 are formed integrally. These attaching pieces 72 are provided at upper portions of the relay duct 69 and rearwardly of the front end connecting opening 71. Also, to each attaching piece 72, a nut is inserted.

The left attaching piece 72 is placed in contact with the lower face of the lower wall 45a of the attaching plate 45 and is detachably attachable from the upper side (the indoor side of the cabin 8) by means of a bolt that extends through this lower wall 45a from the upper side thereof and threaded with the nut provided in the left attaching piece 72.

The right attaching piece 72 is placed in contact with the lower face of the rear portion of the extension wall 44 and is detachably attachable from the upper side (the indoor side of the cabin 8) by means of a bolt that extends through the extension wall 44 from the upper side and threaded with the nut provided with the right attaching piece 72.

Meanwhile, the inspection access opening closing plate 39 defines an escape hole 73 for receiving the head of the bolt used for attaching the front portion of the relay duct 69.

In this embodiment, the relay duct 69 is formed of a foam material, thus eliminating need for any heat insulating material.

Incidentally, the relay duct 69 is not limited to such foam material, but can be molded from non-foam resin molding material or formed of a metal plate or the like.

With the cabin 8 having the above-described construction, by removing the inspection access opening closing plate 39 to the upper side, then removing the bolt used for fixing the attaching piece 72 of the relay duct 69 and then lowering the front portion of the relay duct 69 and withdrawing the front end connecting opening 71 of the relay duct 69 from the lower end connecting opening 68 of the air distributing duct 67 and thereafter moving the relay duct 69 forwardly and withdrawing the rear end connecting opening 70 of the relay duct 67 from the discharging opening 12 of the air conditioner body 10, it becomes possible to remove the relay duct 69 to the upper side through the inspection access opening 40.

With the above, through the inspection access opening 40, inspection of the lower structure of the cabin 8 (inspection of the vehicle body 2 of the tractor 1) can be performed.

In the case of an attaching operation of the relay duct 69, the above-described series of operations will be performed in the reverse order.

In the case of the conventional construction, the relay duct connecting between the air conditioner body and the air distributing duct is disposed upwardly of the front floor. In this case, due to lack of any degree of freedom for the vertical movement of the front portion of the relay duct or the fore/aft movement of the relay duct, the removal of the relay duct is difficult. On the other hand, according to the instant embodiment, as the relay duct 69 is disposed downwardly of the front floor 36, the fore/aft movement of this relay duct 69 and vertical movement of the front portion of the relay duct 69 can be performed readily. As a result, the connection/withdrawal of the rear end connecting opening 70 of the relay duct 69 to/from the discharging opening 12 of the air conditioner body 10 and the connection/withdrawal of the front end connecting opening 71 of the relay duct 69 to/from the lower end connecting opening 68 of the air distributing duct 67 can be performed readily. Consequently, the attachment and detachment of the relay duct 69 can be easily done.

During attachment of the relay duct 69, by removing the front cover plate 50 constituting the upper portion of the air conditioner body accommodating chamber 37, the connection of the rear end connecting opening 70 of the relay duct 69 to the discharging opening 12 of the air conditioner body 10 can be performed by a worker while this worker visually confirms this connection. Also, as the opening 59 which is exposed with removal of the front cover plate 50 is formed continuous with the duct inserting opening 58, the connection of the rear end connecting opening 70 of the relay duct 69 to the discharging opening 12 of the air conditioner body 10 can be readily performed.

Incidentally, if the relay duct were branched into a left part and a right part and these parts were arranged so as to extend along both the right/left sides of the inspection access opening 40, there would result such disadvantages as increased passageway resistance due to the bypassing arrangement, increased resistance due to increase of surface area resulting from the division of the flow passageway into two parts. On the other hand, according to the instant embodiment of the present invention, since the relay duct 69 is extended through the central portion of the bottom of the cabin 8, this duct can be formed of a single large-diameter duct, so that the flow passageway resistance can be reduced advantageously.

Next, with reference to FIGS. 17 through 25, there will be explained the construction and layout of a main duct 124 having a hollow cylindrical structure and forming an indoor air conditioning air passageway 125.

The cabin framework 16 includes: the pair of right/left front pillars 17 disposed on the front side; the pair of right/left rear pillars 18 disposed on the rear side, the upper end heights of the right/left rear pillars 18 being set substantially same as the upper end heights of the right/left front pillars 17; the front upper beam 19 interconnecting the upper ends of the right/left front pillars 17; the rear upper beam 20 interconnecting the upper ends of the right/left rear pillars 18; the side upper beam 21 interconnecting the upper ends of the front pillar 17 and the rear pillar 18 on a same right/left side; the front lower beam 22 interconnecting the lower ends of the right/left front pillars 17; the rear lower beam 23 interconnecting the lower ends of the right/left rear pillars 18; and side rear lower beams 121 each interconnecting the lower portions of the front and rear pillars 17, 18 disposed on a same, right/left side. With these, the cabin frame 16 is constructed in the form of a box-like frame.

The side lower beams 121 have rear half portions thereof raised in the form of arcs in correspondence with the rear wheel fenders of the vehicle body 2 such as a tractor, so that at these portions the pair of right/left rear wheel fenders 30 are attached.

Figure 25:
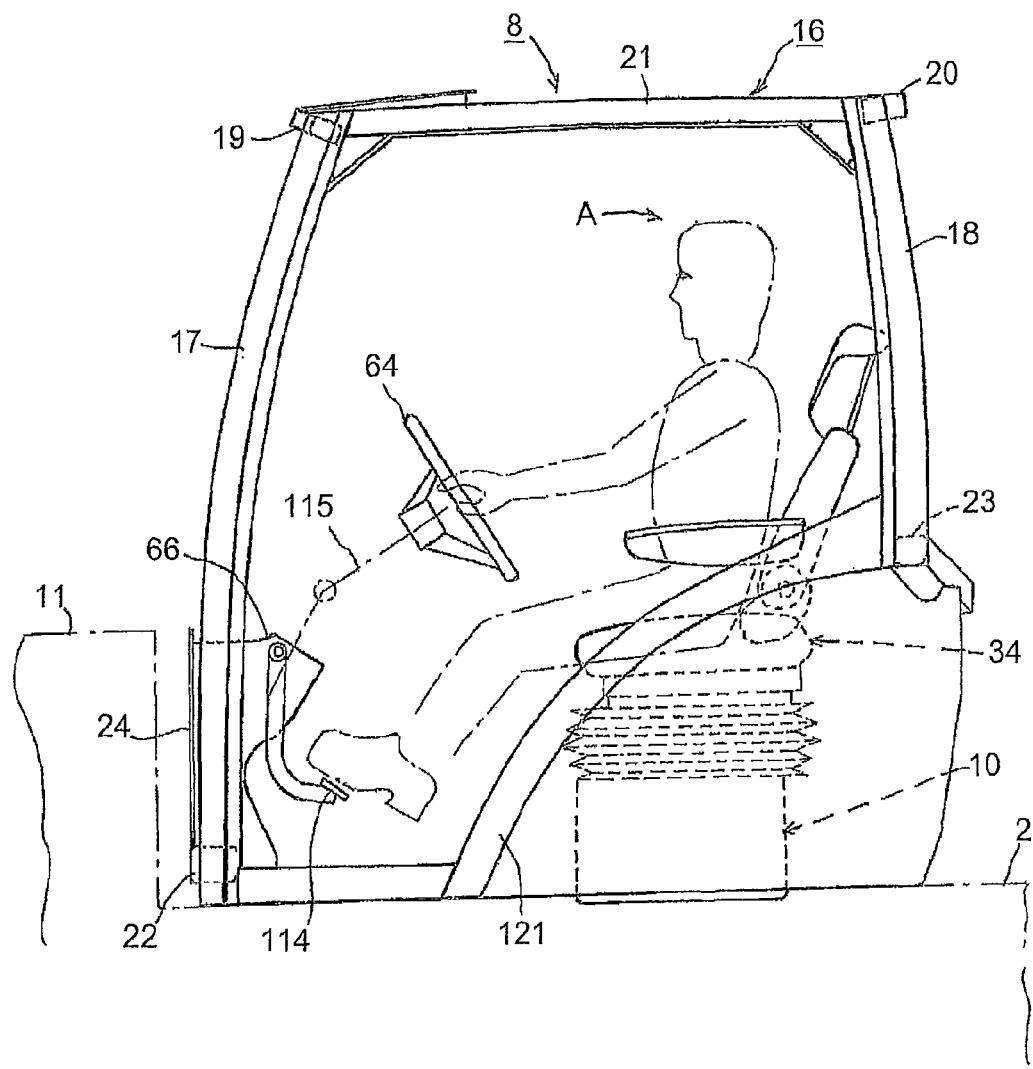
FIG. 25 is a schematic side view of the cabin.

Inside the cabin framework 16 of the cabin 8, as shown in FIG. 25, there is provided the driver's seat 34 in which a driver is to be seated. And, forwardly and downwardly of this driver's seat 34, there is mounted the front cover 66 via the front frame 24. And, to this front cover 66, there are attached a brake pedal 114, an accelerator pedal etc. Further, via a steering column and a steering shaft 115, a steering wheel 116 is mounted.

The cross sectional shape of the front and rear pillars 17, 18 will be explained with taking one of the rear pillars 18 as the representative example. The rear pillar 18, as shown in enlarged scales in FIGS. 21 through 23, has a hollow column (irregular tube) structure of an irregular octagon having first though eighth peripheral faces 18a-18h. The first peripheral face 18a is disposed in opposition to the indoor side of one of four corners of the cabin 8. From the opposed sides of this first peripheral face 18a, the second peripheral face 18b and the third peripheral face 18c are formed continuously with an angle of 45 degrees approximately, respectively. With this, the second peripheral face 18b and the third peripheral face 18c extend substantially perpendicular to each other. From the second peripheral face 18b and the third peripheral face 18c, the fourth peripheral face 18d and the fifth peripheral face 18e are formed continuously in a substantially perpendicular relationship relative thereto, respectively. Further, from the fourth peripheral face 18d and the fifth peripheral face 18e, the sixth peripheral face 18f and the seventh peripheral face 18g are formed continuously in a substantially perpendicular relationship relative thereto, respectively. And, from these sixth peripheral face 18f and the seventh peripheral face 18g, there is continuously formed the eighth peripheral face 18h in a substantially perpendicular relationship relative thereto.

In the above, it should be noted that the eighth peripheral face 18h is formed as an outwardly convex arcuate shape.

Further, to the second peripheral face 18 and the third peripheral face 18c formed in the substantially perpendicular relationship with each other, the terminal ends of the rear upper and lower beams 20, 23 and the side upper and lower beams 21, 15 are to be welded.

With reference to the cross sectional shape of the rear pillar 18 as shown, the fourth peripheral face 18d through the seventh peripheral face 18g form concave stepped portions that are inwardly concave; and at these concave stepped portions, the peripheral edges of the rear panel and the door panel are to be fitted therein.

Figure 17:
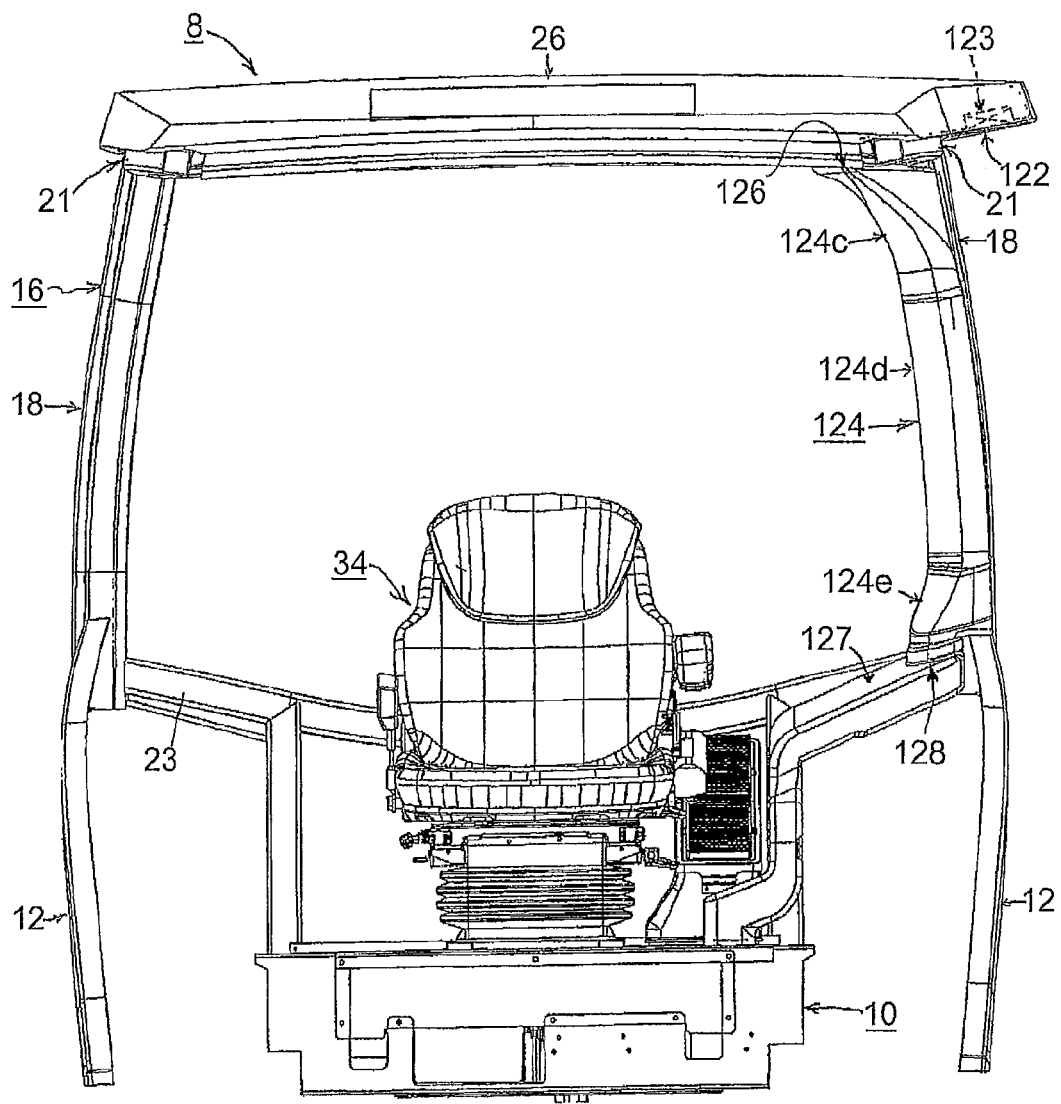
FIG. 17 is a schematic front view in vertical section showing a cabin.
Figure 18:
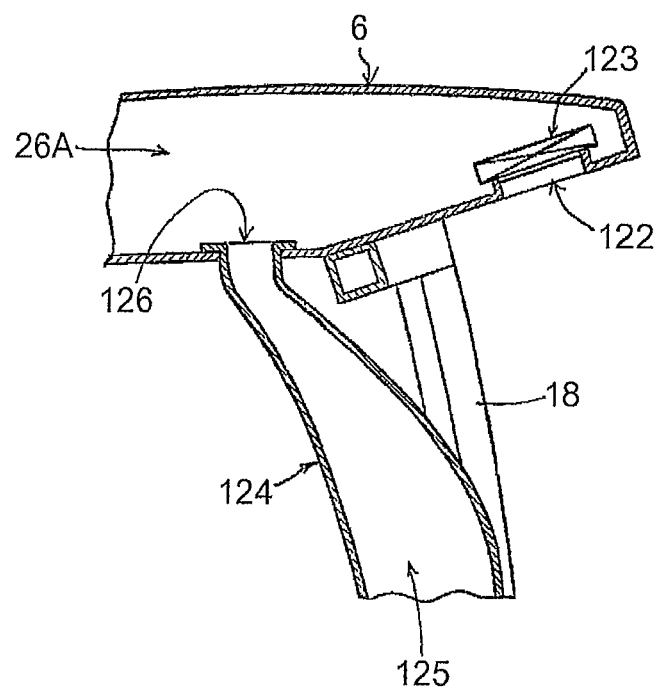
FIG. 18 is a vertical section of principal portions showing relationship between an ambient air introducing opening of a roof and a main duct.
Figure 19:
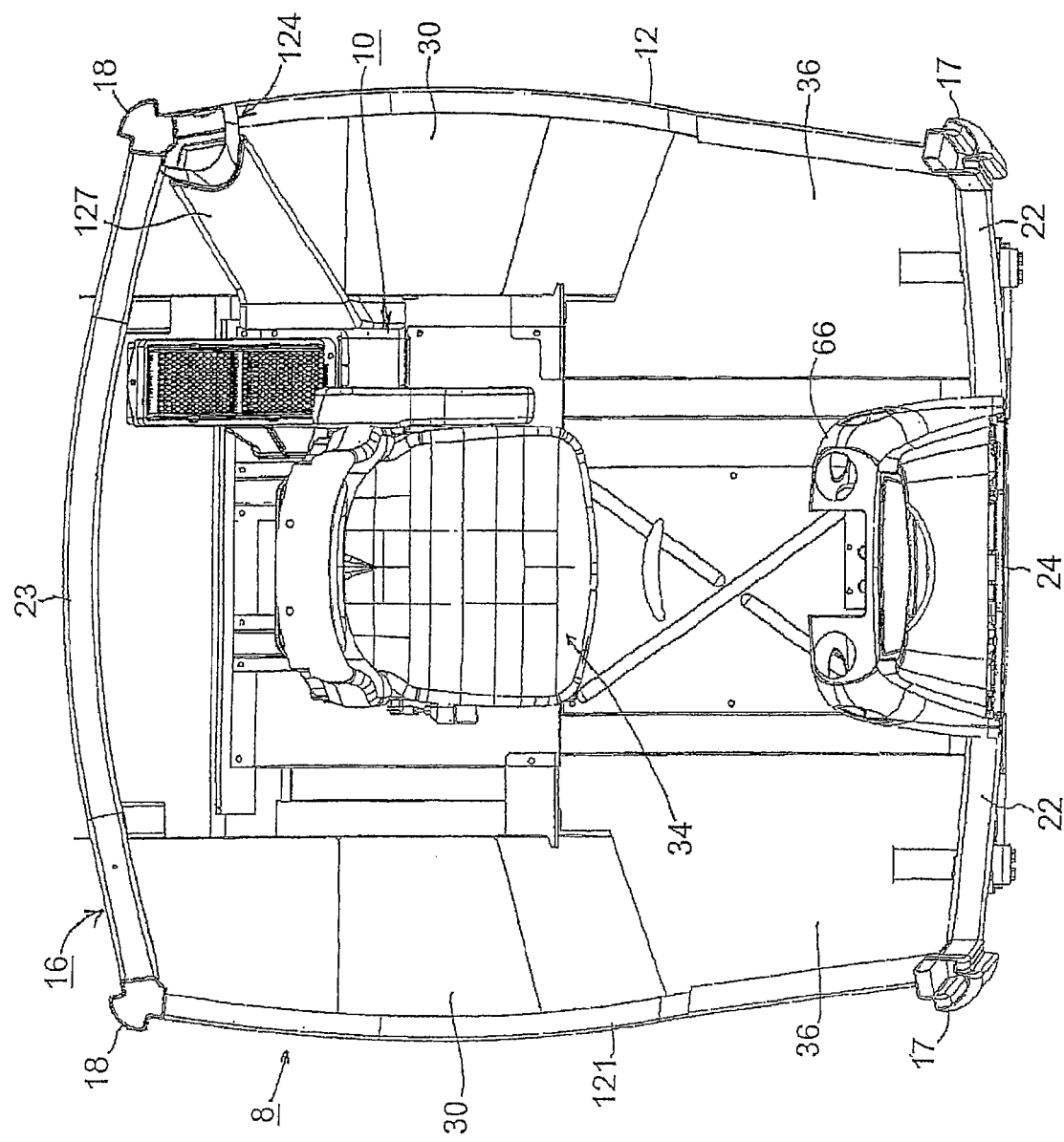
FIG. 19 is a schematic plan view in section showing the cabin.
Figure 20:
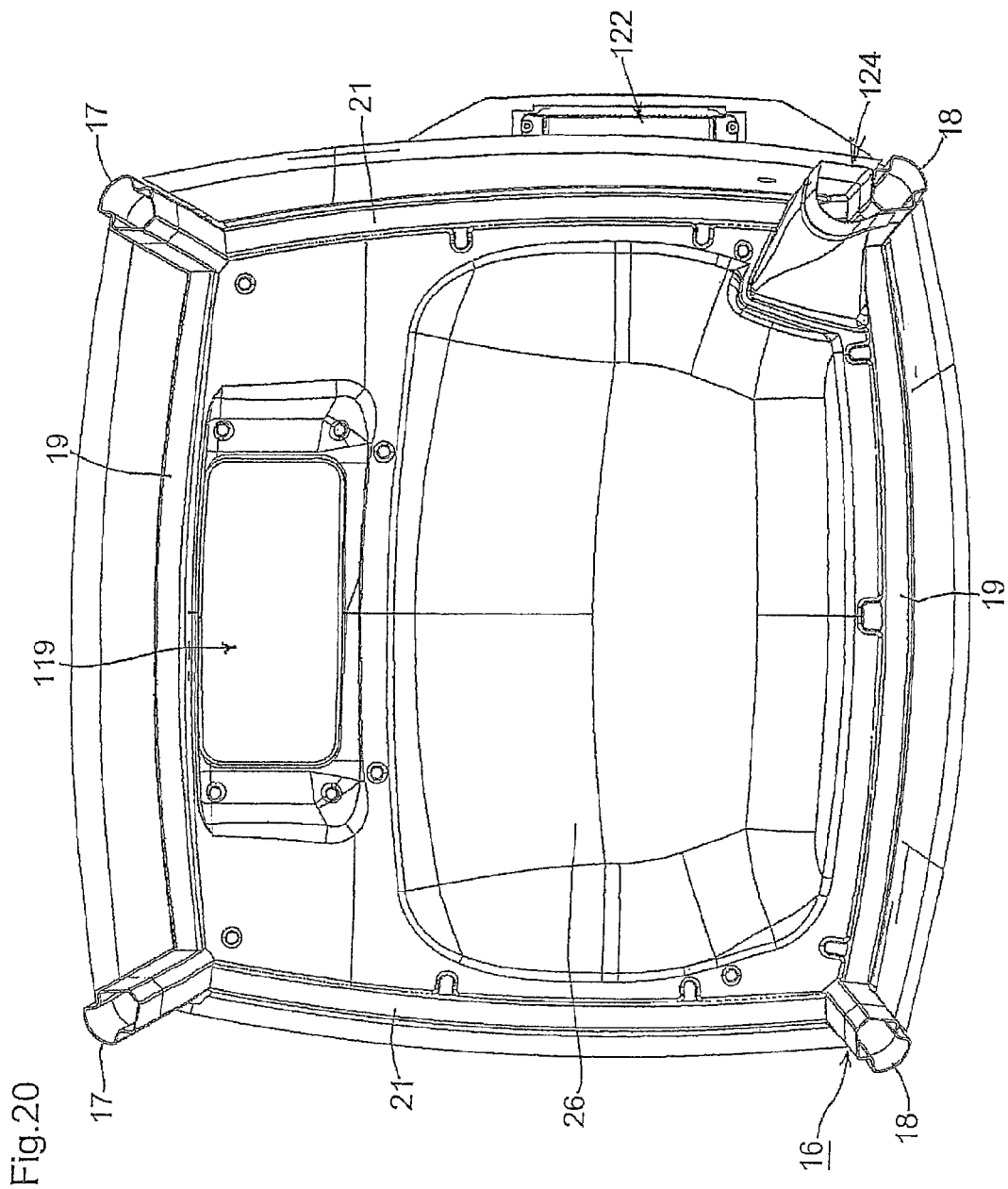
FIG. 20 is a schematic bottom view in section showing the cabin.
Figure 21:
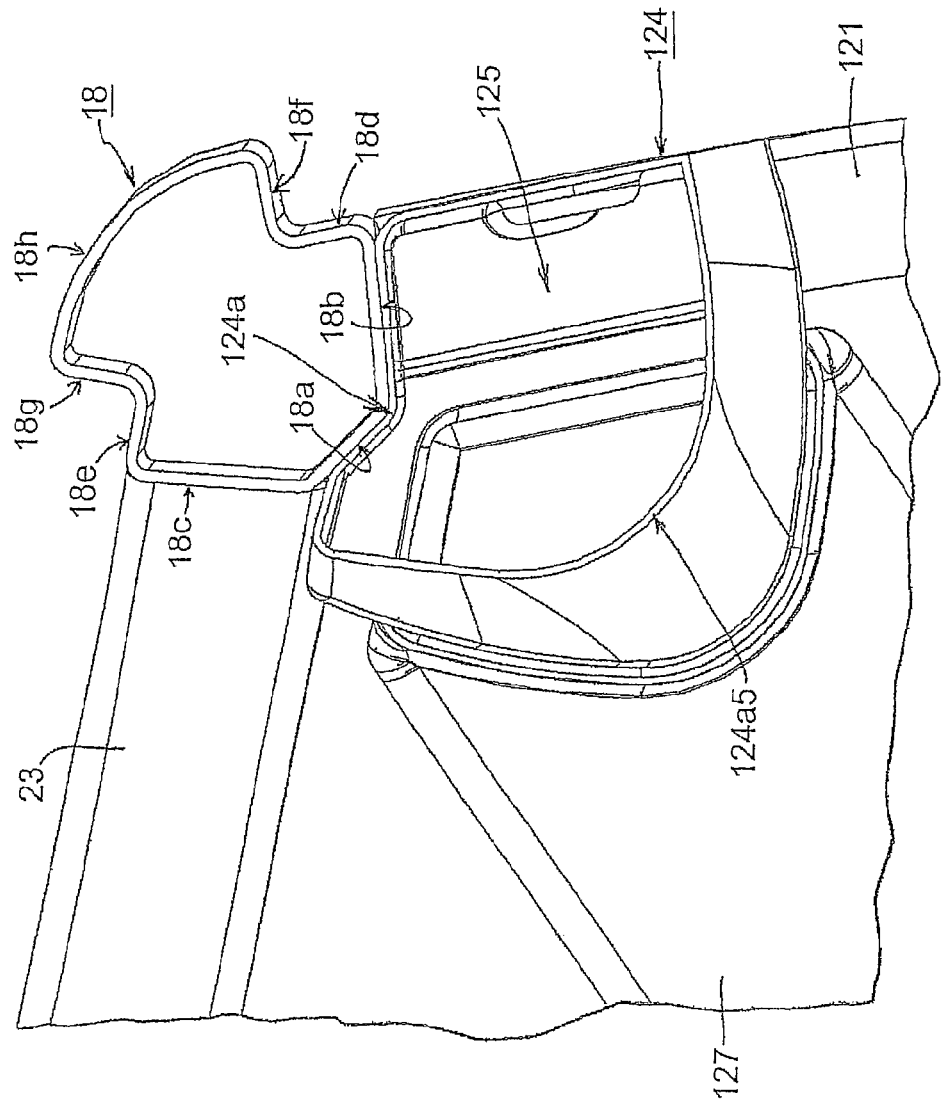
FIG. 21 is an enlarged bottom view in section showing principal portions of the cabin.
Figure 22:
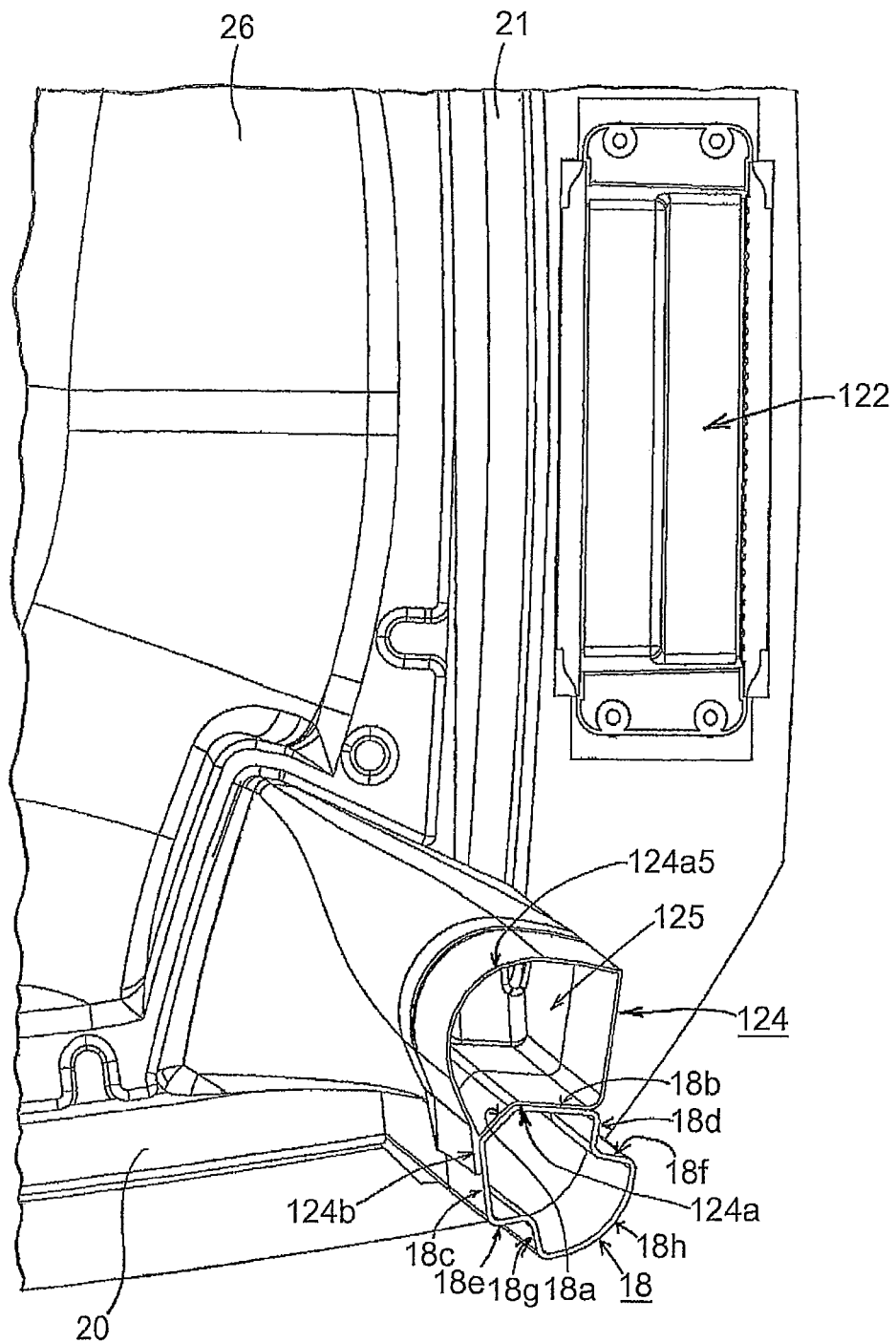
FIG. 22 is an enlarged plan view in section showing principal portions of the cabin.

To the ceiling portion of the cabin 8, as shown in FIG. 17 and FIG. 18, the roof 26 is mounted. In this roof 26, the inside thereof is provided as a hollow portion 26A and an ambient air introducing opening 122 communicated with this hollow portion 26A is formed at an upper portion of one side of the cabin 8. In operation, through a filter 123 attached to this ambient air introducing opening 122, ambient air can be introduced into the hollow portion 26A.

The air conditioner body 10 is configured to introduce ambient air from the hollow portion 26a of the roof 26 through a main duct 124.

The main duct 124 is to be attached to and along the peripheral face of either the front pillar 17 or rear pillar 18 of the cabin 8. In the exemplary embodiment shown, the main duct 124 is attached to the peripheral face of one of the right/left rear pillars 18 (the right side in FIG. 17, that is, the left rear side of the driver's seat 34). (Incidentally, the reason for this arrangement is as follows. As the control panel is disposed on the right side of the driver's seat 34, the driver may view his/her right rear side under his/her natural posture during the operation of the panel. So, even if the main duct 124 is provided on the right rear pillar 18, this hardly limits the rearward view for the driver.)

The main duct 124 is formed of a plastic material and configured to have a hollow tubular construction having the inside thereof acting as the air flow passageway 125. And, as shown in FIGS. 19 through 22, the main duct 124 is attached to and along the peripheral face of the rear pillar 18, in particular, the first peripheral face 18a through the third peripheral face 18c disposed on the indoor side of the cabin 8.

For this reason, the main duct 124 includes, in its peripheral surface, a pillar engaging face 124a.

Figure 23:
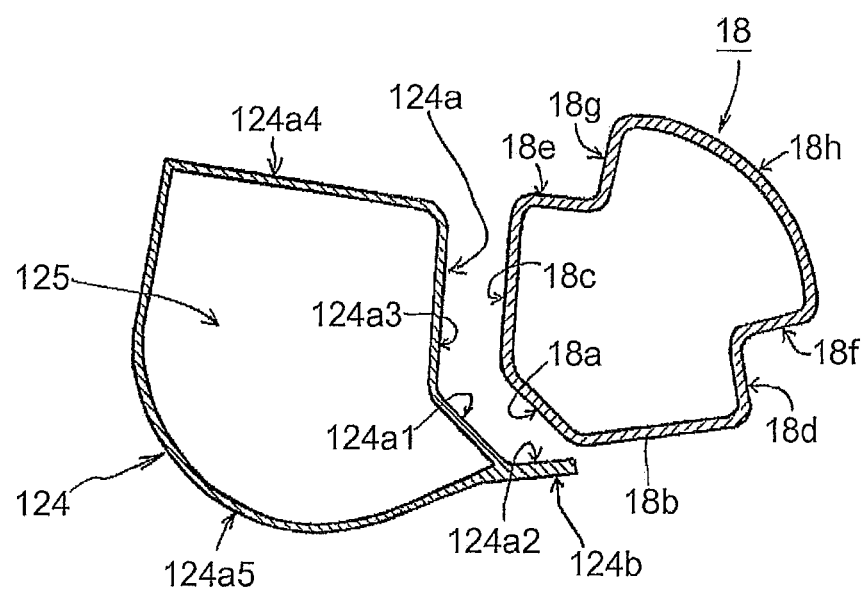
FIG. 23 is an enlarged plan view in section showing relationship between a rear support pillar and the main duct.
Figure 24:
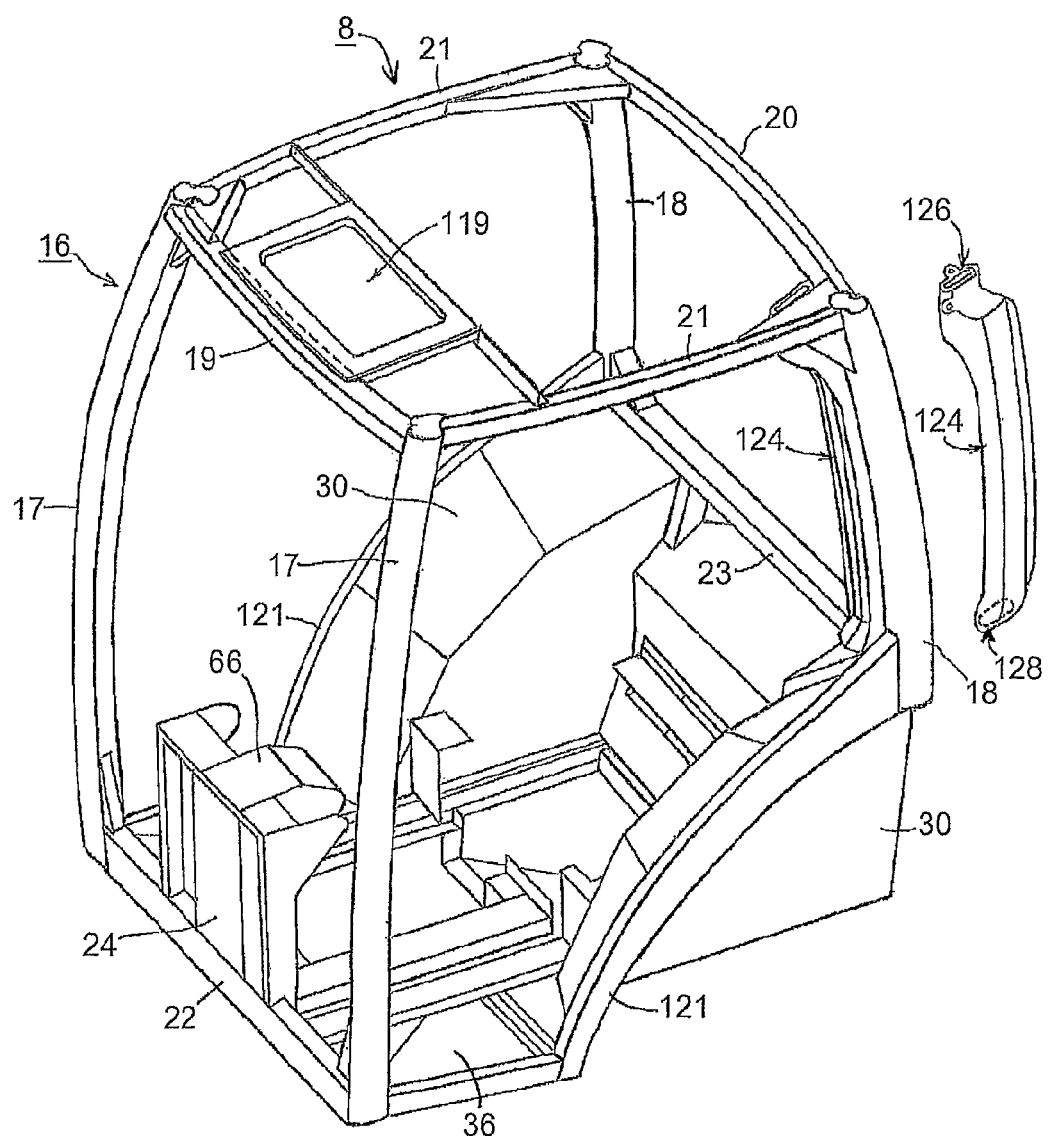
FIG. 24 is a schematic perspective view of the cabin.

This pillar engaging face 124a, as shown in FIG. 23, includes a first outer face 124a1, a second outer face 124a2, a third outer face 124a3 that come into gapless contact with the first peripheral face 18a through the third peripheral face 18c of the rear pillar 18 and the second outer face 124a2 is provided as an attaching flange portion 124b.

And, from the first outer face 124a1 and the third outer face 124a3, a fourth outer face 124a4 and a fifth outer face 124a5 are formed continuously.

The third outer face 124a3 and the fourth outer face 124a4 are formed continuously in a substantially perpendicular relationship with each other. Further, the fourth outer face 124a4 and the fifth outer face 124a5 are formed continuously in a substantially perpendicular relationship with each other. Also, the fifth outer face 124a5 and the first outer face 124a1 are formed continuously at an angle of 45 degrees approximately.

In this way, the main duct 124 is a hollow tubular structure comprised of an irregular polygonal body formed by successively joining the first outer face 124a1, the second outer face 124a2, the third outer face 124a3, the fourth outer face 124a4 and the fifth outer face 124a5 in the form of a loop. In this, the fifth outer face 124a5 has an approximately arcuate shape outwardly convex in order to increase the cross sectional area of the air flow passageway 125 formed therein.

This main duct 124 is attached via its attaching flange portion 124b to the second peripheral face 18b of the rear pillar 18 with an appropriate attaching means such as screws, adhesive agent, etc.

The upper end of the main duct 124, as shown in FIG. 17 and FIG. 18, includes a connecting opening 126 to be communicated to the hollow portion 26A of the roof 26. Further, at the lower end of the main duct 124, there is formed a duct connecting opening 128 to the relay duct 127 to be connected to the air conditioner body 10. Further, the main duct 124 is attached to the rear pillar 18 in a gapless manner so as not to interfere with the operator's working space of the cabin 8 and also to cover the peripheral face of the rear pillar 18 on the indoor side of the cabin 8. In particular, the main duct 124 is attached to extend long in the fore-aft direction along the lateral face of the cabin 8 and short in the right/left direction (see FIGS. 19-22).

Further, in order to facilitate its attachment to the hollow portion 26A of the roof 26 and connection to the relay duct 127 and also to facilitate its manufacture, the main duct 124 is made as three-part separate construction consisting of an upper end portion 124c, an intermediate portion 124d and a lower end portion 124e, and these parts are connected in series at the time of the attachment to the rear pillar 18.

Incidentally, though not shown, the air conditioner body 10 includes an ambient air introducing opening and an indoor air introducing opening and between these openings, a switching damper is provided for selectively providing an ambient air introducing state and an indoor air introducing state. Further, an air delivering duct is provided for delivering an amount of conditioned air from the air conditioner body 10. Through this air delivering duct, conditioned air can be fed to the air distributing openings provided at predetermined locations inside the cabin and a defroster duct disposed on the inner side of the front windshield.

As to the air delivering duct, its illustration is omitted. It is noted, however, this duct has a cross sectional shape similar to the above-described main duct 124 to be attached to a further pillar similarly, and at its upper end, there is provided an air distributing opening for feeding conditioned air to the inside of the cabin 8.

The air conditioner duct apparatus of this embodiment for the cabin 8 of the invention has the above-described construction; and thanks to this construction, there is no need to form a lateral bore at the lower end of the rear pillar 18, so that the required strength of the rear pillar 18 can be readily secured. Further, the size of the aperture of the duct acting as an air communication passageway is not limited to a size smaller than the cross sectional area of the rear pillar 18, so the required size of the aperture area can be secured.

The pillar engaging face 124a of the main duct 124 is formed in correspondence with the indoor side peripheral face of the rear pillar 18, namely, the first peripheral face 18a through the third peripheral face 18c and also is attached to engage and cover the indoor side peripheral face of the rear pillar 18, namely, the first peripheral face 18a through the third peripheral face 18c. Therefore, the positioning performance of the main duct 124 relative to the rear pillar 18 is improved and the attached state can be stable. Furthermore, the indoor side peripheral face of the rear pillar 18 on the indoor side of the cabin 8 can be covered neatly and with good appearance by the main duct 124. In other words, the main duct 124 can function as a covering member for the rear pillar 18.

Moreover, since the main duct 124 includes, at its upper portion, the connecting opening 126 to be connected to the ambient air introducing opening, this main duct 124 can be used also as an ambient air introducing duct for the air conditioner body 10.

Incidentally, if a further main duct having a similar construction to the main duct 124 is attached to a further pillar and this further main duct is provided, at its upper portion, an air discharging opening for discharging air to the inside of the cabin 8, this further main duct can be utilized as a discharging duct for discharging conditioned air from the air conditioner body 10.

Meanwhile, the main duct 124 can alternatively be attached to the left rear pillar 18 in FIG. 17. Also, the ambient air introducing opening 122 can be provided at a position other than the roof 26.

Next, with reference to FIGS. 26 through 30, there will be described relationship between the bottom face 19a of the front upper beam 19 and the line of sight S of the driver A seated at the driver's seat 11.

FIGS. 26 through 29 show the cabin 8 (cabin framework 16) mounted on the tractor vehicle body 2.

The cabin framework 16 includes the pair of right/left front pillars 17 disposed on the front side, the pair of right/left rear pillars 18 disposed on the rear side, the front upper beam 19 interconnecting the upper ends of the right/left front pillars 17, the rear upper beam 20 interconnecting the upper ends of the right/left rear pillars 18, the side upper beam 21 interconnecting the upper ends of the front pillar 17 and the rear pillar 18 on a same right/left side, the front lower beam 22 interconnecting the lower ends of the right/left front pillars 17 and the rear lower beam 23 interconnecting the lower ends of the right/left rear pillars 18, and the side rear lower beam 121 interconnecting the lower portions of the front and rear pillars 17, 18 disposed on a same right/left side. With these, the cabin frame 17 is constructed in the form of a box-like frame.

The side lower beams 121 have rear half portions thereof raised in the form of arcs in correspondence with the rear wheels 7 of the tractor, so that at these portions, the pair of right/left rear wheel fenders 30 are attached.

Figure 26:
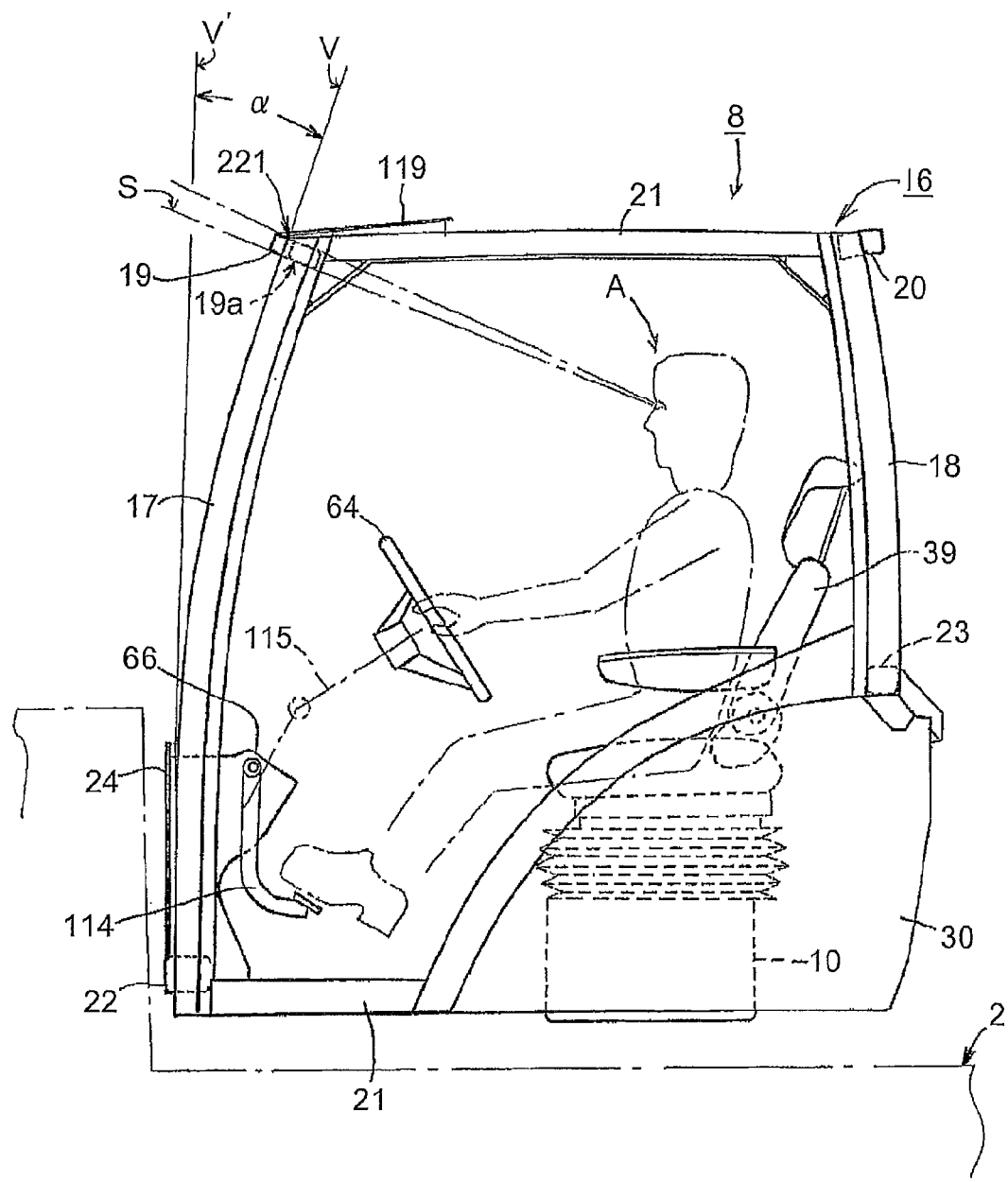
FIG. 26 is a schematic side view of principal portions showing a shape of a bottom face of a front upper beam in one embodiment of the cabin system.
Figure 27:
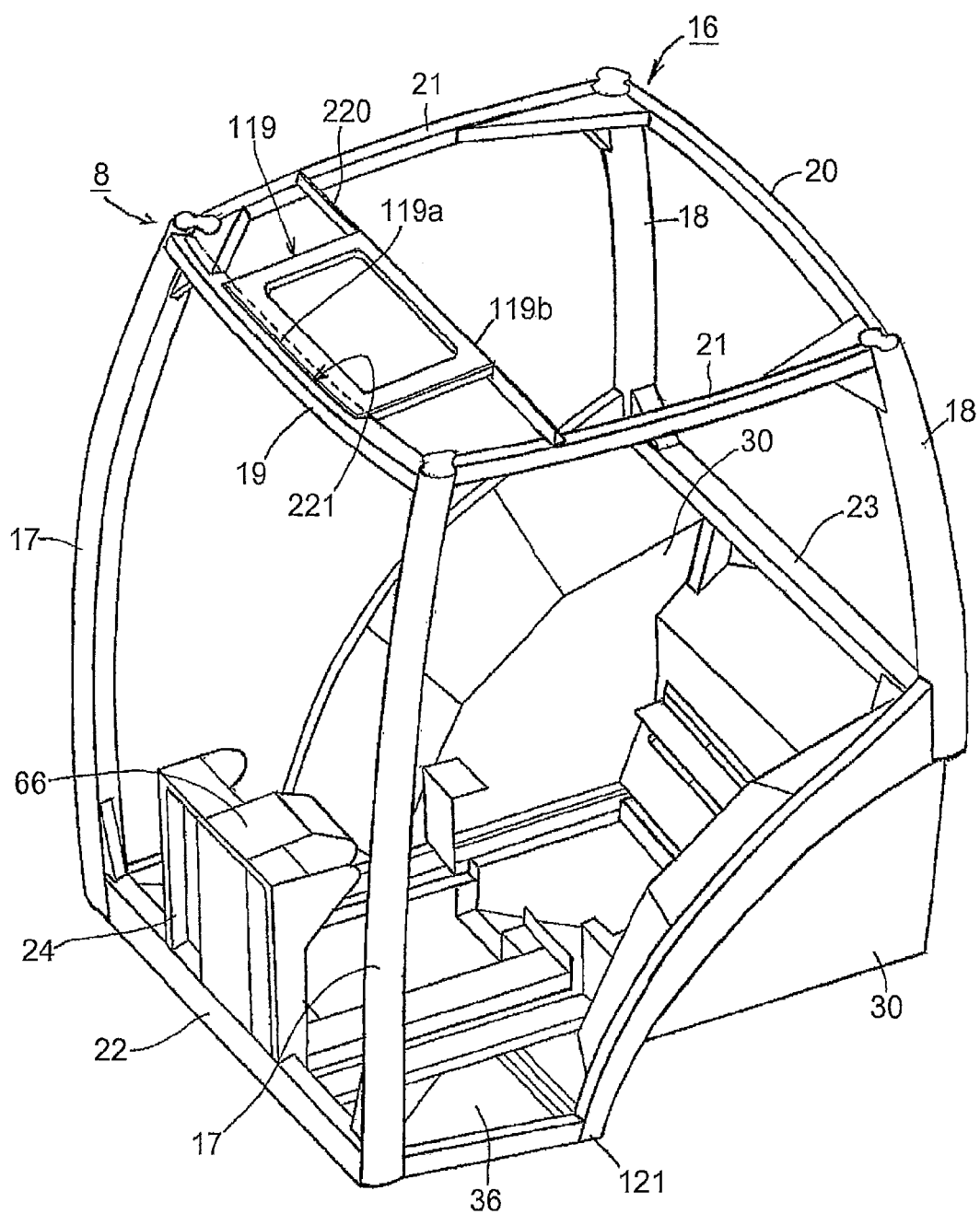
FIG. 27 is a schematic perspective view of the cabin frame.

Inside the cabin framework 16 of the cabin 8, as shown in FIG. 26, there is provided the driver's seat 34 in which a driver A is to be seated. And, forwardly and downwardly of this driver's seat 34, there is mounted the front cover 66 via the front frame 24. And, to this front cover 66, there are attached the brake pedal 114, the accelerator pedal, etc. Further, via the steering column and the steering shaft 115, the steering wheel 64 is mounted. And, downwardly of the drive's seat 34, the air conditioner body 10 is disposed.

To the lower face of the cabin framework 16, the front floor 36 is attached. And, to its front face, the front panel is attached; and to its side face, the door panel is attached; and also to its ceiling, the roof is attached. However, illustrations of these components are omitted.

Figure 30:
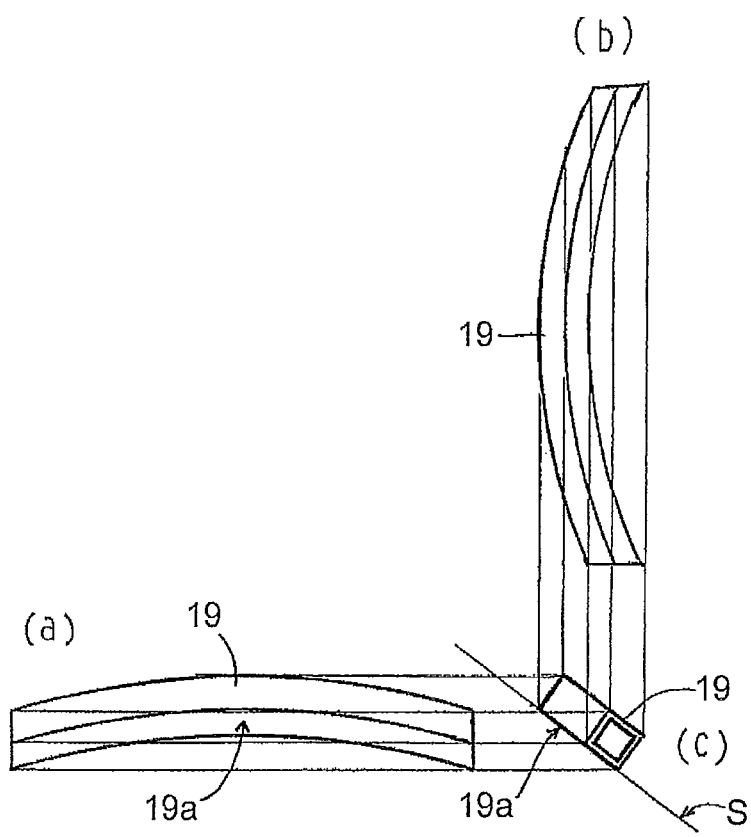
Figure 31:
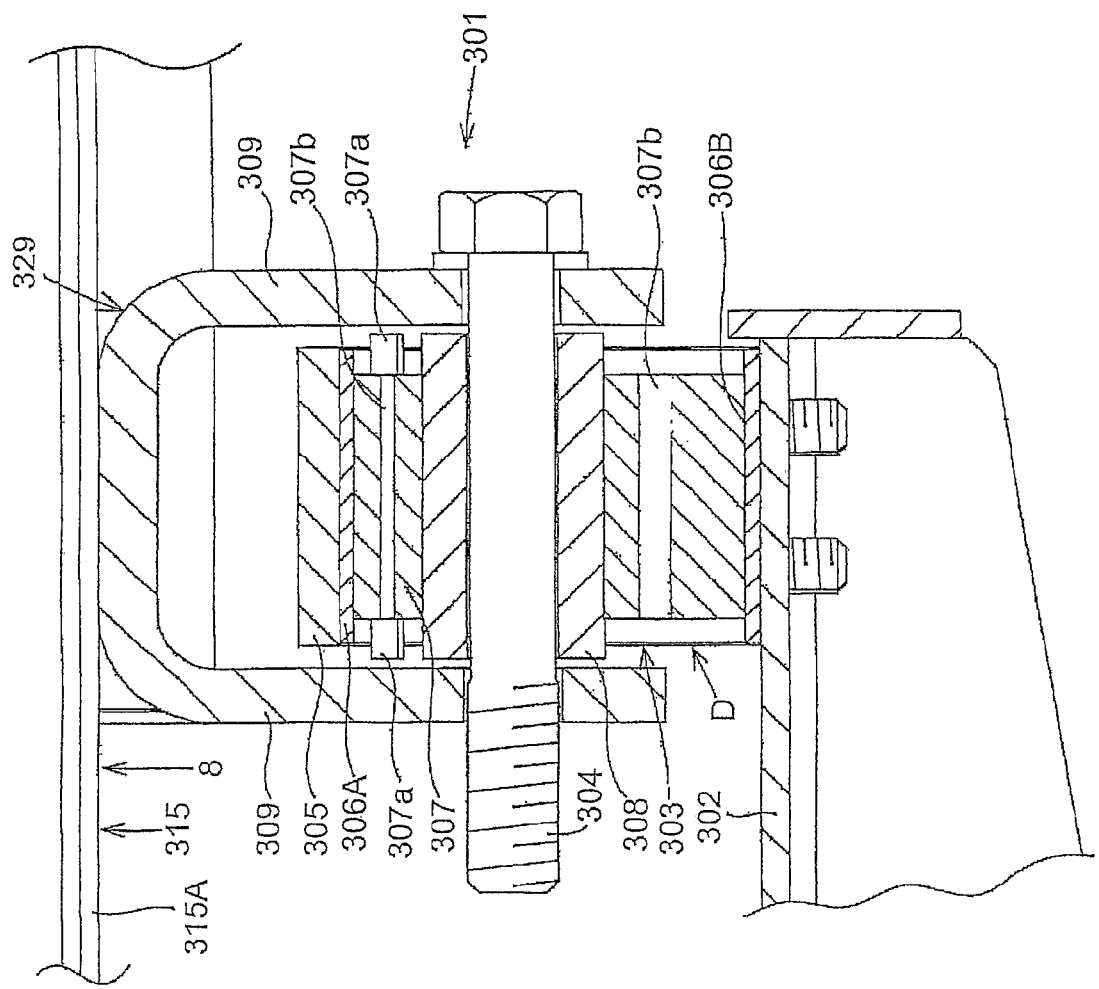
FIG. 31 is front view in section showing an attachment arrangement between the cabin frame according to the invention and a vehicle body.
Figure 32:
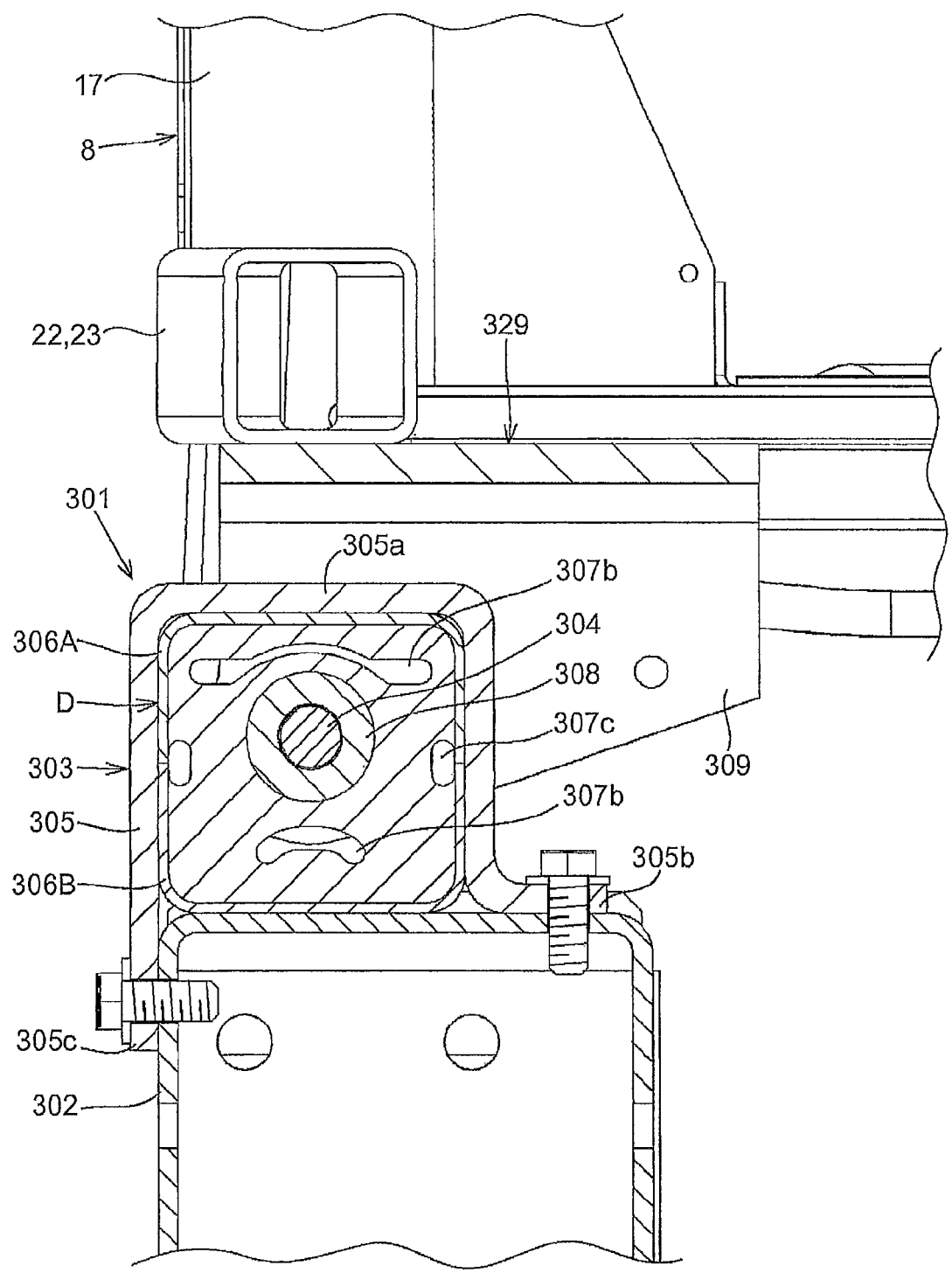
FIG. 32 is a side view in section of the attachment arrangement.
Figure 33:
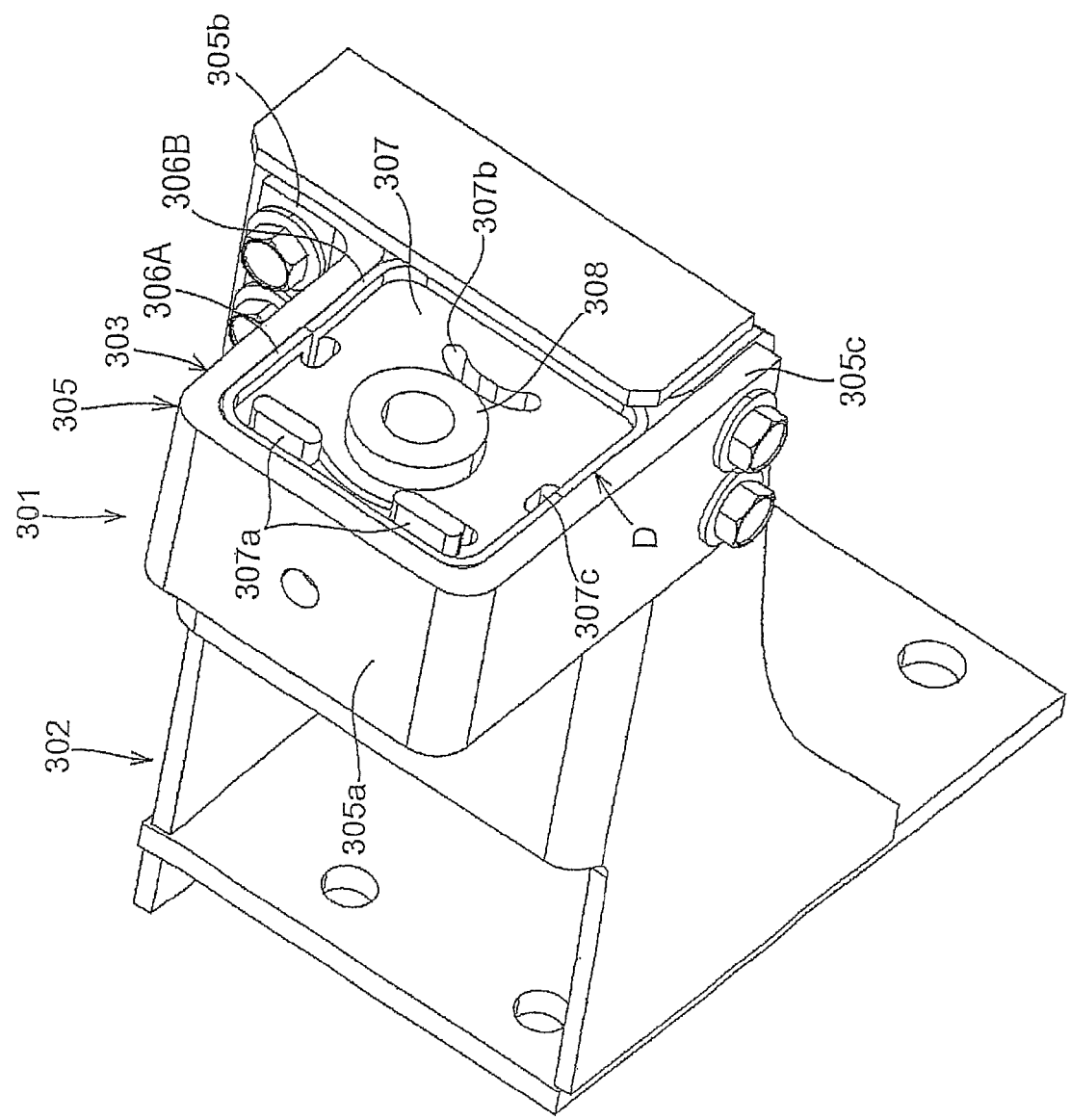
FIG. 33 is a perspective view of the attachment arrangement.
Figure 34:
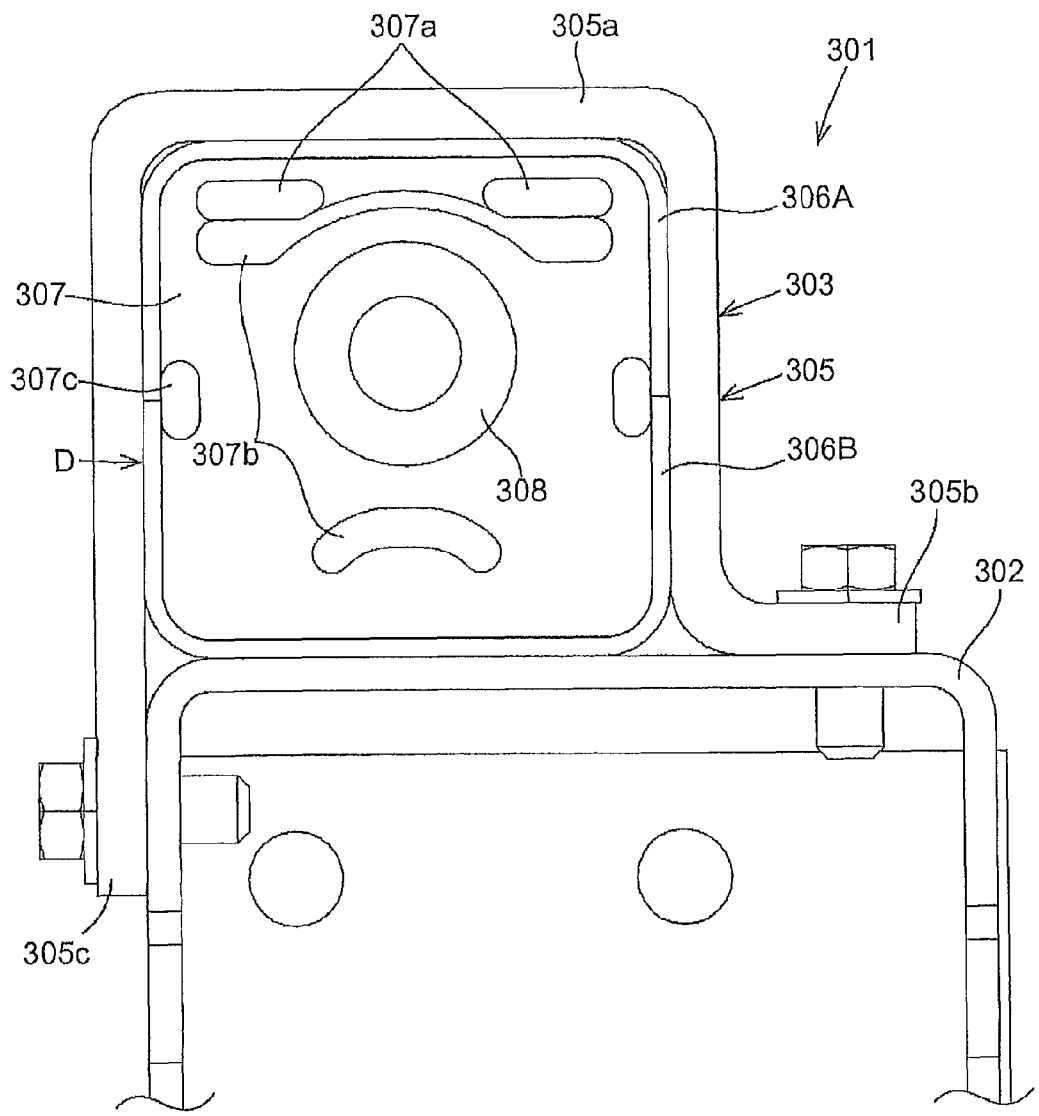
FIG. 34 is a side view of the attachment arrangement.
Figure 35:
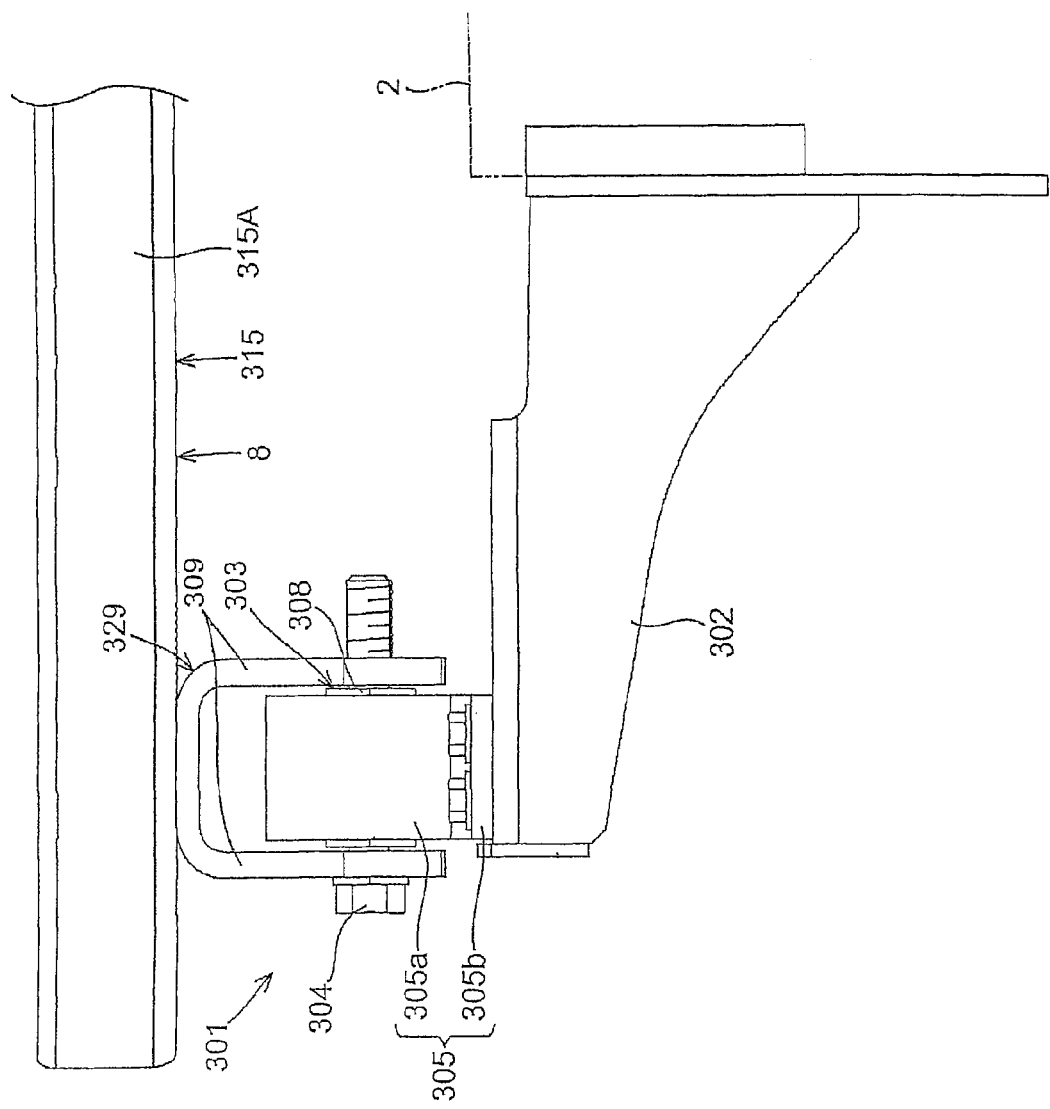
FIG. 35 is a front view of the attachment arrangement.

The front upper beam 19 interconnecting the upper portions of the pair of right/left front pillars 17 is comprised of an angular pipe having a quadrilateral cross sectional shape as shown in FIG. 30; and, as shown in FIG. 26, its bottom face 19a is set substantially parallel with the line of sight S of the driver A seated at the driver's seat 34 inside the cabin framework 16.

Further, the front upper beam 19, as shown in FIG. 30, is curved in the form of a forwardly convex arch along a plane parallel to the bottom face 19a thereof.

And, as shown in FIG. 26, the front pillar 17 has its upper front face V inclined rearward at a predetermined angle α relative to a vertical plane V', which is a virtual plane extending normal to the ground and tangentially of the front pillar 17, so that this upper front plane V intersects substantially perpendicularly the line of vision S of the driver A seated at the driver's seat 34 inside the cabin framework 16.

As the front upper beam 19 is attached by the above-described arrangement to the upper portion of the front pillar 17, the shape of the front upper beam 19 as seen from the front face of the cabin framework 16 can be formed in the upwardly raised arch shape (see FIG. 30 and FIG. 26) so that the forward upper field of view of the driver A can be enlarged.

Also, as the front upper beam 19 is attached under the above-described posture to the upper portion of the front pillar 17, the front upper beam 19 is attached with the projecting direction of the convex curved shape being set parallel with the line of vision of the driver who views the forward upper side. As a result, the area of the driver's view field obstructed by the front upper beam 19 can be minimized.

That is, the area of the driver's view field obstructed by the front upper beam 19 will be maximum when the diagonal line of the quadrilateral cross section of the angular pipe is perpendicular to the line of vision of the driver A. In order to avoid this, the attaching position of the front upper beam 19 should be set as shown in FIG. 26 such that the bottom face 19a is set parallel with the line of view S of the driver A inside the cabin framework 16 who sees the forward upper side.

Also, at a front upper portion of the cabin framework 16, as shown in FIGS. 26 through 29, a skylight window frame 119 is provided. This skylight window frame 119 has its upper face formed flat and its front frame 119a is welded to the front upper beam 19 by means of welding or otherwise; and its rear frame 119b is attached by means of welding or otherwise to a skylight window attaching beam 220 supported between the right/left side upper beams 21, 21.

Figure 28:
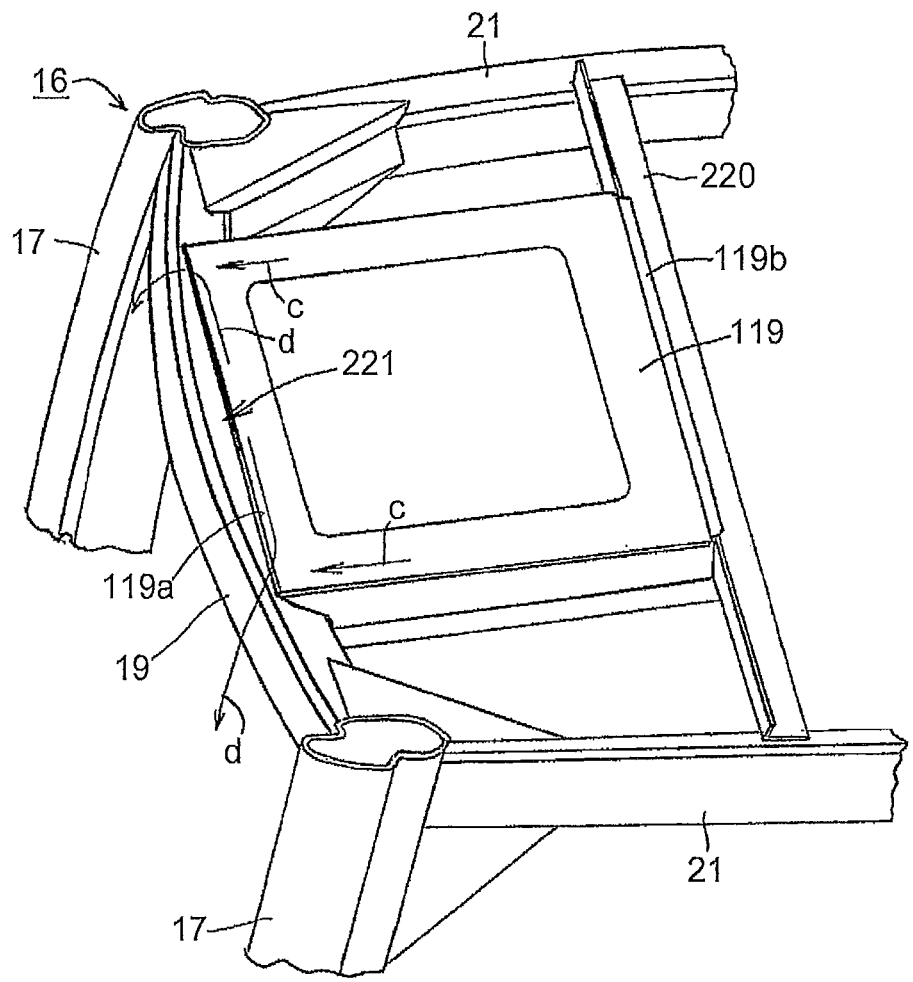
FIG. 28 is an enlarged perspective view showing vicinity of a skylight window portion of the cabin frame.
Figure 29:
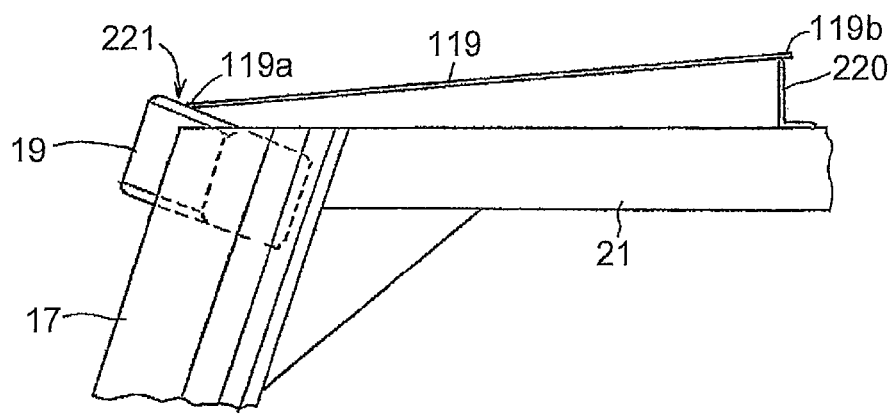
FIG. 29 is an enlarged side view showing the vicinity of the skylight window portion of the cabin frame, FIG. 30 are three side views showing the front upper beam alone of the cabin frame drawn by the orthographic drawing technique, (a) being a front view, (b) being a plan view, (c) being a side view.

The skylight window frame 119 is attached with its front side being located lower than its rear side. As shown in FIG. 28 through FIG. 30, the front upper beam 19 is configured such that its portion at the longitudinal center is higher than its opposed ends as seen in front view and projects forwardly from the opposed ends as seen in plan view. With these, the upper face of this front upper beam 19 and the front frame 119a of the skylight window frame 119 together form a rain gutter 221 at the front upper portion of the cabin framework 16 for draining rainwater to the opposed right/left ends of the cabin framework 16. Incidentally, the flow directions of rainwater are indicated by arrows (c) (d) in FIG. 28.

With the above-described construction of the cabin system according to the foregoing embodiment of the present invention, the shape of the front upper beam 19 as the cabin framework 16 is viewed from its front side can be an raised arch-like shape, and in this, as there is no need for upwardly extending the pair of right/left front pillars 17, increase of the total height and enlargement of the cabin framework 16 can be avoided advantageously. Further, as this is readily possible by a two-dimensional work for rendering the shape of the front upper beam 19 into the forwardly convex arch shape. So, the work cost can be restricted low. Moreover, the front upper beam 19 is attached with the arch-like projecting direction being parallel with the line of vision S of the driver A inside the cabin framework 16 who views the forward upper side, so that the obstructed area of field vision by the front upper beam 19 can be minimized.

Further, as the front upper beam 19 is formed of the angular pipe having a quadrilateral cross sectional shape, the work performed for forming the forwardly convex arch along the plane parallel with the bottom face of the front upper beam 19 can be easily performed and the required strength can be readily obtained.

Also, in the front upper beam 19, as the front frame 119a of the skylight window 119 is attached to the upper face so that the upper face of the front upper beam 19 and the front frame 119a together form, at the front upper portion of the cabin framework 16, the rain gutter 221 for discharging rainwater to the opposed right/left sides of the cabin framework 16. This arrangement eliminates the need for separately providing a dam projecting portion projecting upward at the roof front end in order to prevent rainwater falling onto the roof from flowing along the front windshield of the cabin, thus obstructing the driver's field of view.

Next, with reference to FIGS. 31 through 40, an attachment arrangement for attaching the cabin framework 16 to the vehicle body 2 will be described. This attachment arrangement is embodied as an anti-vibration supporting apparatus. In the case of a conventional anti-vibration supporting apparatus, as disclosed in EP 0 863 066 A1, a horizontal shaft disposed at a front lower portion of the cabin is supported via a support body to a support bracket fixed to a tractor vehicle body, and the support body has an elastic member and to be press-fitted into a hole defined in a cast holder fixedly attached to the support bracket. With this anti-vibration supporting apparatus, however, the cast holder and the elastic member to be press-fitted therein are costly.

Further, as an arrangement fixedly attached to a support bracket for attaching a support body, JP 2003-056643 A1 discloses a technique wherein an elastic body is clamped and fixed between upper and lower brackets that can be separated from each other. In this anti-vibration supporting apparatus, too, the upper and lower brackets and the elastic body are costly; and also due to poor shape retaining ability of the elastic body, the attachment to the upper and lower brackets is difficult.

In contrast, with an anti-vibration supporting apparatus to be described next, an elastic body, a holder etc. can be manufactured at low costs and attachment to the support bracket is easy. The characterizing features of this apparatus are as follows.

(1) A horizontal shaft 304 disposed at a front lower portion of the cabin 8 is supported via a support body 303 to a support bracket 302 fixed to the vehicle body 2. The support body 303 includes a holder 305 to be attached to the support bracket 302, a shape-retaining plate 306 formed of a metal plate and held by the holder 305 and the support bracket 302, an elastic body 307 disposed within the shape-retaining plate 306 and supported thereby in at least three directions, and a cylinder 308 disposed within the elastic body 307 and engaged with the horizontal shaft 304. The shape-retaining plate 306 and the elastic body 307 are fixedly attached to each other and the holder 305 is attached to the support bracket 302, with the shape-retaining plate 306 being displaced close to the cylinder 308 thus compressing the elastic body 307.

(2) The shape-retaining plate 306 has an anti-rotating shape for preventing rotation of the holder 305 in the peripheral direction. Further, at each right/left front power portion of the cabin 8, there are provided a pair of supporting walls 309, and the horizontal shaft 304 is disposed to extend through the pair of supporting walls 309 and the cylinder 308 of the support body 303 disposed between the walls 309 and on the opposed side faces of the elastic body 307, there are provided projecting portions 307a that can come into contact with the respective supporting walls 309.

(3) The elastic body 307 defines a deformable gap portion 307b provided on at least one of upper and lower sides of the cylinder 308.

(4) The shape-retaining plate 306 is formed of upper and lower two members 306A, 306B, with these upper and lower shape-retaining plates 306A, 306B being movable toward/away from the cylinder 308 so as to compress the elastic body 307.

Next, embodiments of the anti-vibration supporting apparatus described above will be described.

Figure 37:
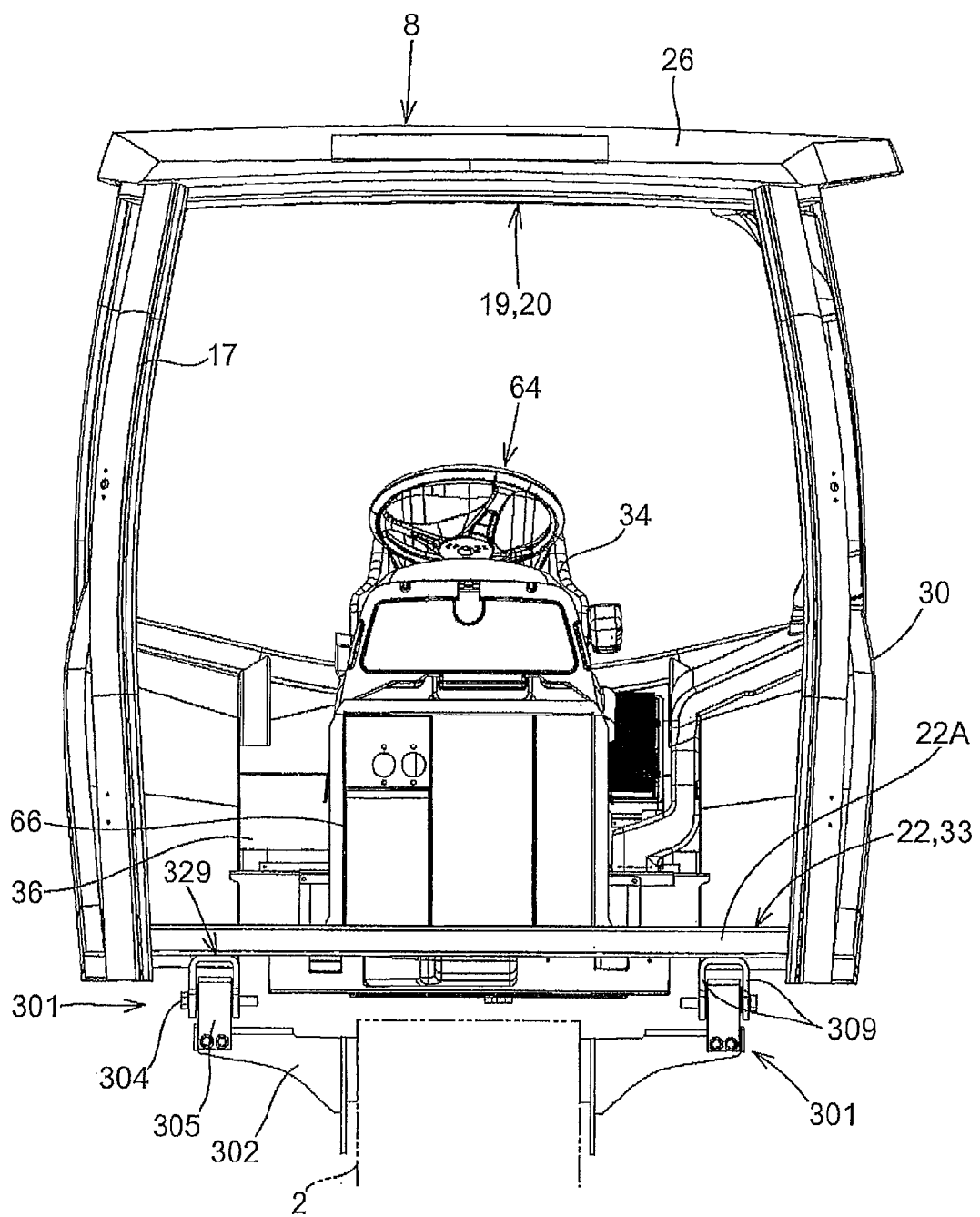
FIG. 37 is a front view of a cabin attached to the vehicle body with the attachment arrangement.
Figure 38:
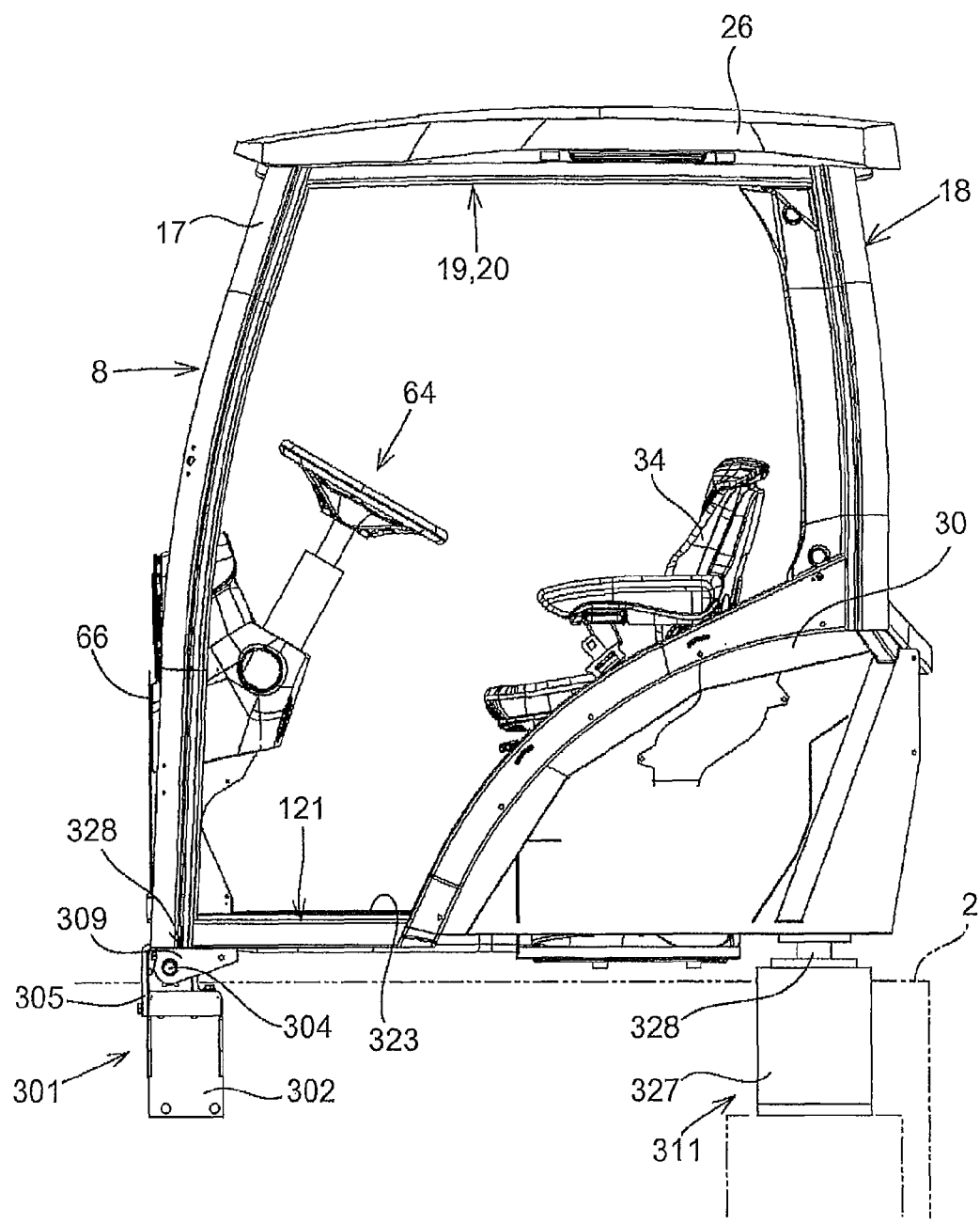
FIG. 38 is a side view of the cabin attached to the vehicle body with the attachment arrangement.
Figure 39:
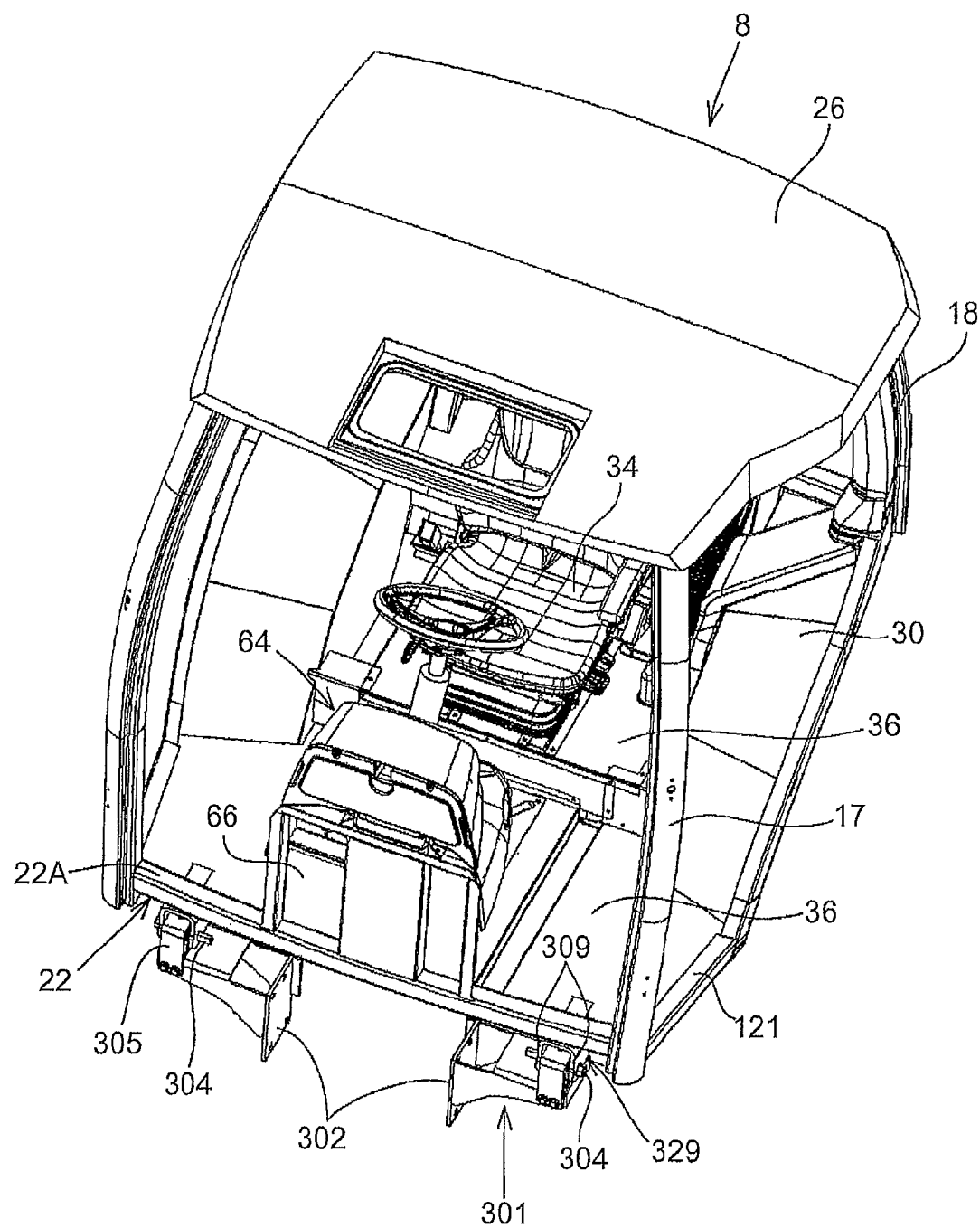
FIG. 39 is a perspective view of the cabin attached to the vehicle body with the attachment arrangement.

In FIGS. 37 through 39, there is shown a cabin 8 mounted on the vehicle body 2 of a tractor via front and rear anti-vibration supporting apparatuses 301, 311. This cabin 8 includes the cabin framework 16 having the pair of right/left front pillars 17, the pair of right/left rear pillars 18, the front and rear upper beams 19, 20 interconnecting the upper ends of the right/left front pillars 17, the upper ends of the rear pillars 18 and the upper ends of the front and rear pillars 17, 18, and the front and rear lower beams 22, 23 interconnecting the lower ends of the right/left front pillars 17, the lower ends of the right/left rear pillars 18 and the lower ends of the front and rear pillars 17, 18.

The roof 26 is attached to the front and rear upper beams 19, 20 of the cabin framework 16; and to the front and rear lower beams 22, 23, there is provided the front floor 36 for attaching the step 18 and the driver's seat 34. To the right/left sides of the front floor 36, the rear wheel fenders 20 are connected; and between the front members 22A of the front and rear lower beams 22, 23 and the right/left front pillars 17, there is attached the front over 66 to which the steering wheel 64 is attached.

Also, though not shown, between the right/left front pillars 17, a front windshield is fitted. Between the right/left rear pillars 18, a rear windshield is fitted. And, the front and rear pillars 17, 18 form an entrance/exit opening 323 and to the right/left rear pillars 18, there is pivotally supported a door for opening/closing the entrance/exit opening 323.

In the rear anti-vibration supporting apparatus 311, supporting decks 327 are mounted on rear axle cases 326 projecting to the right/left from the rear portion of the vehicle body 2. And, on this supporting deck 327, the rear lower face of the cabin 8 is received and supported via an elastic support body 328 for absorbing vertical and four-side horizontal vibrations.

In the front anti-vibration supporting apparatus 301, to the side face of the vehicle body 2 at its fore/aft intermediate portion, there is fixed the support bracket 302 projecting outward to the right/left, and this support bracket 302 receives and supports the front lower face of the cabin 8 via the support body 303 that absorbs fore/aft and vertical vibrations.

To the lower face of the front member 22A provided at the front portion of the cabin 8, a pair of right/left connecting brackets 329 are fixedly attached. Each one of these connecting brackets 329 has a portal shape in its front view and its upper portion is fixedly attached to the front member 22A and its right/left opposed sides project downwardly from the front member 22A to form the pair of supporting walls 309, and between and through these supporting walls 309, the horizontal shaft 304 in the form of a bolt extends.

In FIGS. 31-36; the support body 303 includes the holder 305 to be attached to the support bracket 302, the shape-retaining plate 306 formed of a metal plate and held by the holder 305 and the support bracket 302, the elastic body 307 (mounting rubber) disposed within the shape-retaining plate 306 and supported thereby in the four directions, and the cylinder 308 disposed within the elastic body 307 and engaged with the horizontal shaft 304.

The holder 305 is formed by bending an iron plate having a width engageable between the right/left supporting walls 309, into an angular hooked shape. And, at each end portion of the engaging portion 309a having the angular hooked shape, there are formed an upper face fixing portion 305b to be bolt-fixed to the upper face of the support bracket 302 and a front face fixing portion 305c to be bolt-fixed to the front face of the support bracket 302.

The shape-retaining plate 306, the elastic body 307 and the cylinder 308 together form an elastic support tool D constructed independently of the holder 305. This elastic support tool D is clamped and fixed by the upper face of the support bracket 302 in cooperation with the engaging portion 305a of the holder 305.

The elastic body 307 is formed of a synthetic rubber or a synthetic resin having elasticity and its inner peripheral face is engaged with the cylinder 308. The elastic body 307 can be made separable from the cylinder 308 or fixed thereto by baking. The outer peripheral face of the elastic body 307 has a quadrilateral shape in the side view which shape is similar to the shape of the engaging portion 305a of the holder 305.

The elastic body 307 defines therein the gap portion 307b provided on at least one of upper and lower sides of the cylinder 308. This gap portion 307b extends between and through the right/left opposed ends of the elastic body 307 and provided as a gap or hollow portion which can be deformable by compression and which damps, through its deformation, vibration that is propagated from the support bracket 302 to the horizontal shaft 304.

At front and rear portions in the outer peripheral face of the elastic body 307, recesses 307c are formed in opposition to the shape-retaining plate 306.

The elastic body 307 has its width along the direction of horizontal shaft shorter than the cylinder 308, but at front and rear upper portions of each right/left end face, there are formed a pair of projecting portions 307a projecting outward to the right/left side. The leading end of this projecting portion 307a is located at the same position as the end face of the cylinder 308 or projects slightly from the end face of the cylinder 308. Hence, when the elastic body 307 is elastically deformed when receiving load from the horizontal shaft 304, the elastic body 307 can project from the end face of the cylinder 308 to come into contact with the support wall 309. With this contact of the projecting portion 307a, contact between the shape retaining plate 306 and the cylinder 308 with the support wall 309 can be avoided.

The shape retaining plate 306 includes a lower shape retaining plate 306B that receives and holds the lower portion of the elastic body 307 and is received and held by the support bracket 309 and an upper shape retaining plate 306A that is movable to/from this lower shape retaining plate 306B and that has an angular hooked shape in its side view engageable with the side face and the upper face of the elastic body 307. Each one of the upper and lower shape retaining plates 306A, 306B is formed of a metal plate in the form of approximately angular hooked shape in its side view and having a substantially same width as the holder 305 and a smaller thickness than the holder 305 and the plate is fixed by baking or bonding to the outer peripheral face of the elastic body 307.

The upper and lower shape retaining plates 306A, 306B are disposed in opposition to each other so as to form a quadrilateral frame in the side view, with the opposed edges thereof facing each other to cover the elastic body 307 having the quadrilateral side view shape from the upper and lower sides thereof. The opposed edges of these upper and lower shape retaining plates 306A, 306B are in opposition to the front and rear recesses 307c in the outer peripheral face of the elastic body 307.

Figure 36:
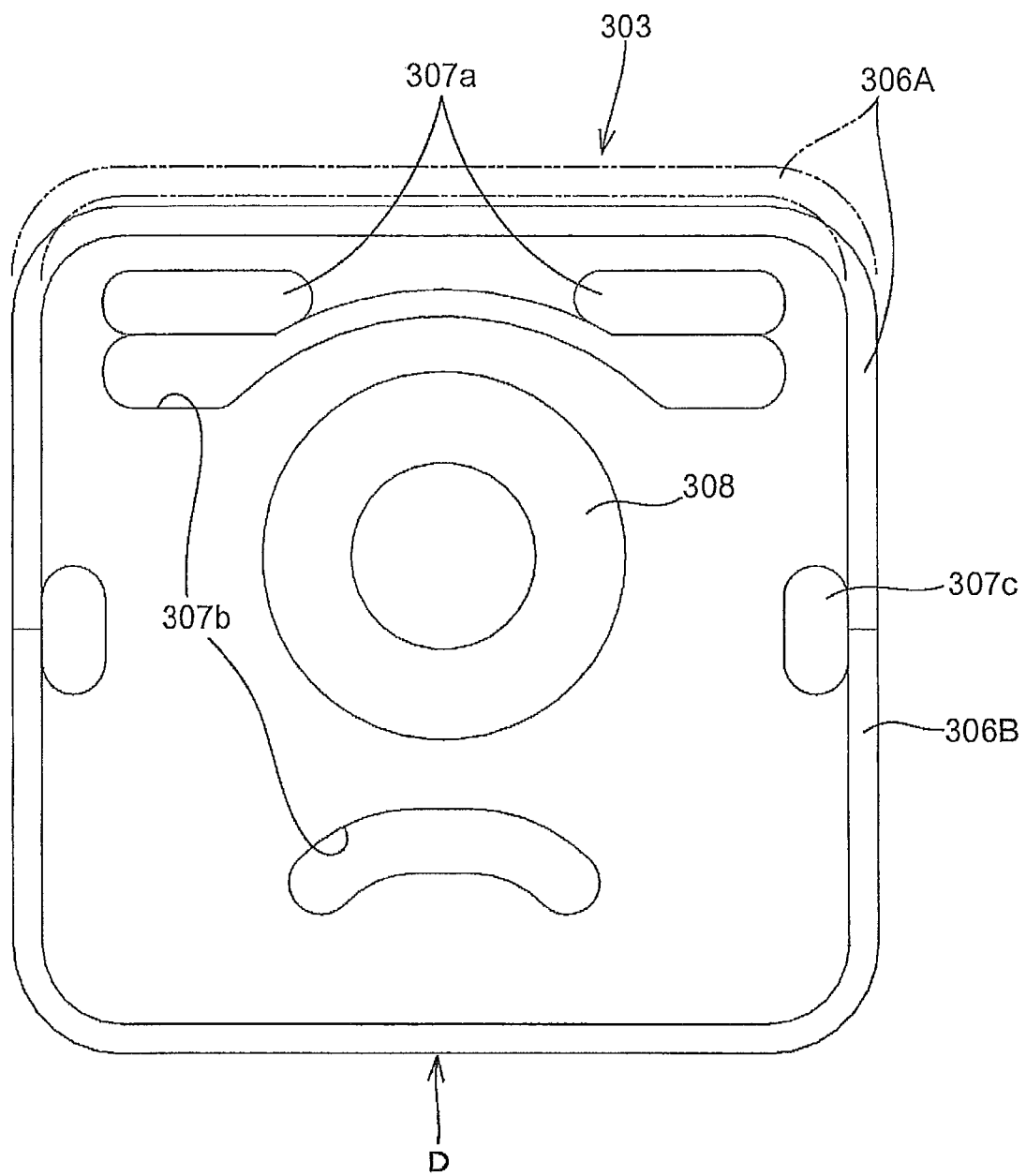
FIG. 36 is a side view of a support body.

Under the free state of the elastic support tool D prior to its attachment to the support bracket 302, the elastic body 307 is not yet compressed, so the upper and lower shape retaining plates 306A, 306B remain separate from each other as illustrated in FIG. 36, so that the front and rear recesses 307c allow the approaching and departing movements of the upper and lower shape retaining plates 306A, 306B. Hence, by moving the upper and lower shape retaining plates 306A, 306B closer to the cylinder 308, the elastic body 307 can be compressed.

As the shape retaining plate 306 and the elastic body 307 have the quadrilateral shape in the side view, when the shape retaining plate 306 is in engagement with the engaging portion 305a of the angular hooked shaped, there is provided anti-rotation shape for preventing rotation of the holder 305 in the peripheral direction.

Further, the vertical size of the angular hooked shape portion of the engaging portion 305a of the holder 305 is set smaller than the vertical size of the elastic support tool D under its free state. So, when the upper face fixing portion 305b of the holder 305 is bolt-fixed to the upper face of the support bracket 302 with the elastic support tool D being inserted into the engaging portion 305a, the upper and lower shape retaining plates 306A, 306B move closer to the cylinder 308, thereby to compress the elastic body 307, and under this condition, the support body 303 is fixed to the support bracket 302.

In the support body 303, the cylinder 308 is engaged with the horizontal shaft 304 of the cabin 8 and the radial outer side of this cylinder 308 is surrounded by the elastic body 307. The shape retaining plate 306 covers this elastic body 307 from its outer side and is fixed thereto. The shape retaining plate 306 is mounted on the support bracket 302 fixed to the vehicle body 2; and from its upper side, the engaging portion 305a of the holder 305 is engaged to cover the outer side of the shape retaining plate 306. And, as this holder 305 is moved closer to the support bracket 302, the holder 305 displaces the shape retaining plate 306 toward the cylinder 308, thus compressing the elastic body 307 and the holder 305 is attached to the support bracket 302.

The horizontal shaft 304 extends through the pair of supporting walls 309 and the support body 303 therebetween on the support bracket 302 and the shaft 304 pivotally supports the front portion of the cabin 8 and elastically supports the load of the cabin 8 by the support body 303 and damps vibration transmitted from the vehicle body 2 side to the cabin 8 through elastic deformation of the elastic body 307 and spatial deformation of the gap portion 307b.

Figure 40:
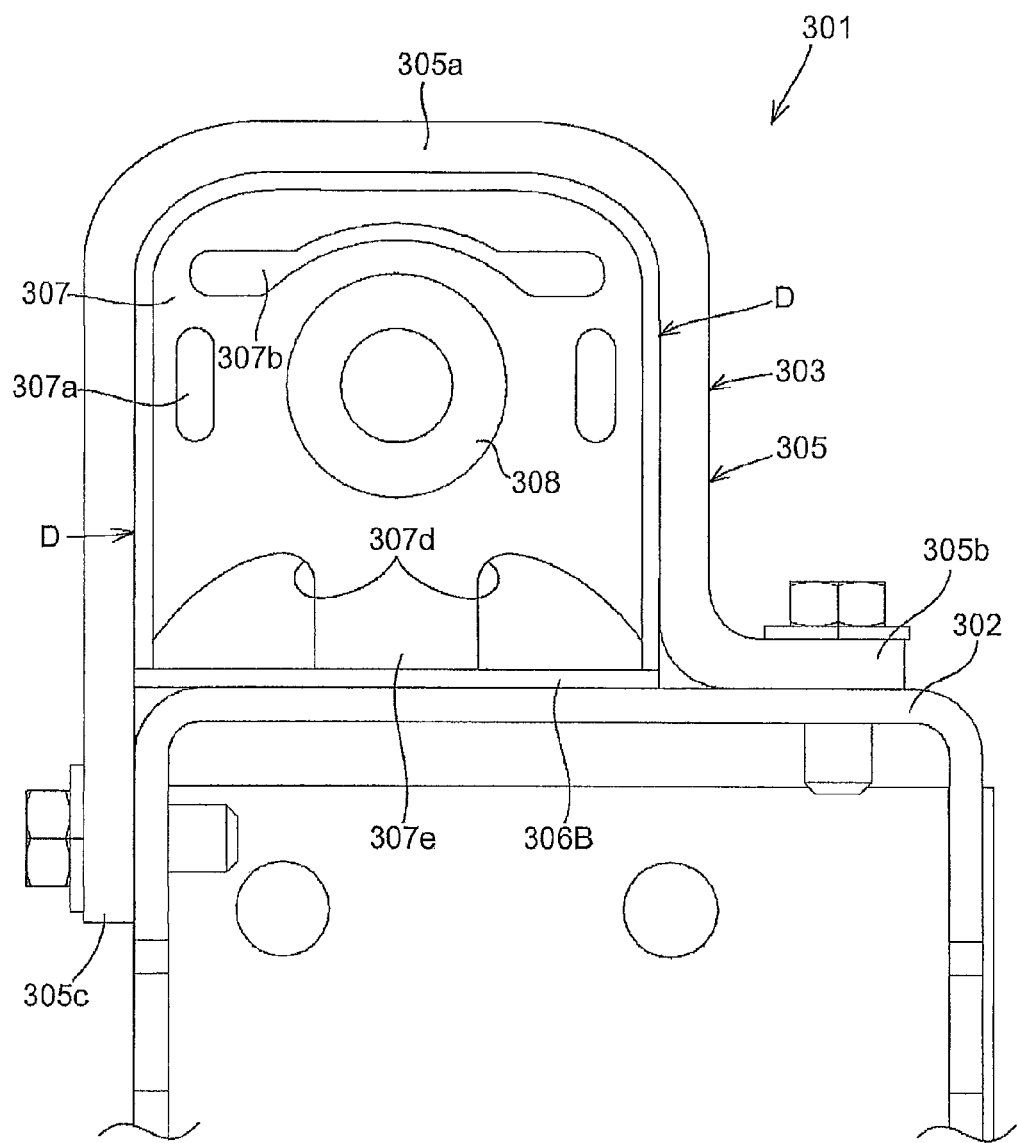
FIG. 40 is a side view showing a modified example of the support body.

FIG. 40 shows a modified example of the support body 303.

The projecting portions 307a on the side face of the elastic body 307 are disposed on the front and rear sides of the lateral side of the cylinder 308 and upwardly of the cylinder 308, a gap portion 307b is formed and downwardly of the same, gap portions 307d are formed. The front and rear corners in the upper portion are formed as R-shaped chamfered faces with large curvature, and between and at a lower center of the lower gap portions 307d, a supporting convex portion 307e is formed.

Referring to the shape retaining plate 306, the upper shape retaining plate 306A has an approximately portal shape (angular hooked shape) suitably engageable with the upper portion of the elastic body 307 and the lower shape retaining plate 307B is a flat plate in opposition to the lower face of the elastic body 307 and the upper face of the support bracket 302. With these, the supporting convex portion 307e of the elastic body 307 can be supported and also intrusion of the elastic body 307 to the R-shaped chamfered portion of the front upper face of the support bracket 302 is prevented.

The upper and lower shape retaining plates 306A, 306B are movable toward/away from each other. By moving these toward the cylinder 308, the elastic body 307 can be compressed. At the time of assembly, the elastic body 307 is brought into a compressed state between the holder 305 and the support bracket 302. The lower shape retaining plate 306B can be separated from the upper shape retaining plate 306A and the elastic body 307. Instead, this lower shape retaining plate 306B can be baked to the supporting convex portion 307e in advance.

With the support body 303 of this modified example too, as the cylinder 308 is engaged with the horizontal shaft 304 and the load of the cabin 8 is supported by the support body 303, vibration transmitted from the vehicle body 2 side to the cabin 8 is damped through elastic deformation of the elastic body 307 per se and spatial deformations of the upper gap portion 307b and the lower gap portions 307d.

Incidentally, it is understood that the shapes and the fore/aft, right/left and upper/lower positional relationships of the respective components of the embodiment are best when configured as shown in FIGS. 31-40. However, the invention is not limited thereto and the members, the arrangements can be varied in many ways and the combinations thereof too can be changed.

For instance, the anti-vibration supporting apparatus for the cabin can be applied also to a swivel work machine such as a backhoe. The shape retaining plate 306 can be angular hooked shape covering the upper face and the front, rear and side faces of the elastic body 307, but not covering the lower face contacting the support bracket 302.

The angular hooked side view shaped upper and lower shape retaining plates 306A, 306B can be formed with a shape with the bent opposed side portions thereof extending in a fan shape with a progressively increased distance therebetween from the center portion, so that the plates can be inserted into the support body 303 with reducing the distance between the opposed leading ends thereof. In this case, in association with the reduction in the distance between the opposed leading ends having the angular hook shape, the elastic body 307 disposed therein can be brought into a compressed state.

The gap portion of the elastic body 307 may not extend through the elastic body 307 and instead a sponge member or a rubber softer than the elastic body 307 can be charged therein. What is needed is provision of a portion which can be compressed and deformed more readily than the elastic body 307 per se.

Further, in modified examples, the elastic support tool D and the engaging portion 305a of the holder 305 can be formed in a triangular shape in the side view. Or, with omission of the lower shape retaining plate 306B, the elastic body 307 can be surrounded in three directions with the upper shape retaining plate 306A alone. The elastic body 307 can be contacted and supported to the upper face of the support bracket 302 or the projecting portion 307a can be provided in the supporting convex portion 307e.

With the above-described anti-vibration supporting apparatus in operation, as the support body 303 is placed on the support bracket 302 fixed to the vehicle body 2 to engage the holder 305 and this holder 305 is fixed to the support bracket 302. Through cooperation of these members, the elastic body 307 is compressed and is attached under this compressed state, thereby to support the horizontal shaft 304 elastically. In the support body 303, the elastic body 307 is fixed within the shape retaining plate 306 made of metal plate and within this elastic body 307, the cylinder 308 engaged with the horizontal shaft 304 is provided. Hence, the elastic body 307 is shape-retained between the shape retaining plate 306 and the cylinder 308, and as the holder 305 is attached to the support bracket 302, the shape retaining plate 306 is displaced closer to the cylinder 308, whereby the elastic body 307 is compressed.

The shape retaining plate 306 serves not only to retain the shape of the elastic body 307, but also to prevent rotation of the holder 305 in the peripheral direction.

At the front lower portions of each right/left side of the cabin framework 16, there are provided the pair of supporting walls 309 and the horizontal shaft 303 is disposed therebetween. Further, the horizontal shaft 304 extends through these components and on the opposed side faces of the elastic body 307, there are provided the projecting portions 307a contactable to the supporting walls 309 and the elastic body 307 is always positioned appropriately in the right/left direction relative to the horizontal shaft 304 and the holder 305, etc.

The elastic body 307 forms the gap portion 307b at least in one of the upper and lower sides of the cylinder 308 and in addition to the elastic deformation of the elastic body 307 per se, deformation occurs also in the gap portion 307b, so that vibration from the vehicle body 2 can be damped sufficiently.

If the shape retaining plate 306 is comprised of the upper and lower shape retaining plates 306A, 306B for vertically surrounding the elastic body 307, these plates not only provide the shape retaining function for the elastic body 307, but also facilitate its attachment to the holder 305. And, by moving the upper and lower shape retaining plates 306A, 306B closer to the cylinder 308, the elastic body 307 can be compressed.

The cabin system of the invention can be applied not only to an agricultural tractor or a construction work tractor, but also to other kinds of various work machines such as a combine, a backhoe.

What we claimed is:

1. A cabin system to be mounted on a vehicle body, said cabin system comprising:
   a driver's seat;
   an air conditioner body for indoor air conditioning disposed downwardly of the driver's seat;
   a plurality of support pillars constituting a cabin framework;
   a ceiling portion;
   an air distributing duct vertically extending forwardly of the driver's seat;
   a relay duct for connecting the air distributing duct to a conditioned air discharging opening of the air conditioner body;
   an inspection access opening defined at a right/left center of a front floor constituting a floor face forwardly of the driver's seat;
   an inspection access opening closing plate for closing the inspection access opening, the inspection access opening closing plate being attachable/detachable from inside the cabin;
   wherein the relay duct is disposed downwardly of the inspection access opening closing plate and the relay duct can be detached toward the inside of the cabin through the inspection access opening.

2. The cabin system according to claim 1, wherein
said discharging opening of the air conditioner body is open to the forward side, and a lower end connecting opening of said air distributing duct is open to the downward side;
a rear end connecting opening of said relay duct is connectable from the forward side to the discharging opening of the air conditioner body; and
a front end connecting opening of said relay duct is connectable from the lower side to a lower end connecting opening of said air distributing duct, with said rear end side connecting opening being kept connected to said discharging opening of the air conditioner body.

3. The cabin system according to claim 1, wherein
at a lower portion of a front face of an air conditioner body accommodating chamber for the air conditioner body, there is provided a duct inserting opening for inserting a rear end connecting opening of said relay duct to the inside of the air conditioner body accommodating chamber; and
to an upper portion of the front face of said air conditioner body accommodating chamber, there is detachably attached a front cover plate constituting a portion of the front face of the air conditioner body accommodating chamber.

4. The cabin system according to claim 3, wherein an opening which is opened with removal of said front cover plate is continuous with said duct inserting opening.

* * * * *